US012078953B2

(12) United States Patent
Toyota

(10) Patent No.: US 12,078,953 B2
(45) Date of Patent: Sep. 3, 2024

(54) IMAGE FORMING APPARATUS AND FIXING UNIT

(71) Applicant: CANON KABUSHIKI KAISHA, Tokyo (JP)

(72) Inventor: Akitoshi Toyota, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/487,580

(22) Filed: Oct. 16, 2023

(65) Prior Publication Data

US 2024/0045368 A1 Feb. 8, 2024

Related U.S. Application Data

(63) Continuation of application No. 17/897,703, filed on Aug. 29, 2022, now Pat. No. 11,822,282.

(30) Foreign Application Priority Data

Sep. 15, 2021 (JP) ................................ 2021-150220

(51) Int. Cl.
*G03G 15/20* (2006.01)
*G03G 21/16* (2006.01)

(52) U.S. Cl.
CPC ..... *G03G 21/1647* (2013.01); *G03G 15/2017* (2013.01); *G03G 21/1633* (2013.01); *G03G 21/1685* (2013.01)

(58) Field of Classification Search
CPC ........... G03G 15/2017; G03G 21/1633; G03G 21/1647; G03G 21/1685
See application file for complete search history.

(56) References Cited

U.S. PATENT DOCUMENTS 9,268,275 B2 2/2016 Iwase
10,459,382 B2 10/2019 Iizuka
(Continued)

FOREIGN PATENT DOCUMENTS

JP H0980943 A 3/1997
JP 2003140480 A 5/2003
(Continued)

OTHER PUBLICATIONS

Extended European search report issued in European Appln. No. 22193595.0, mailed on Jan. 26, 2023.
(Continued)

*Primary Examiner* — Sophia S Chen
(74) *Attorney, Agent, or Firm* — ROSSI, KIMMS & McDOWELL LLP

(57) ABSTRACT

An image forming apparatus includes an image forming portion configured to form a toner image on a sheet, a fixing portion configured to heat and pressurize the sheet bearing the toner image to fix the toner image to the sheet, a shutter provided to be movable to an open position at which the shutter opens an opening that the sheet being conveyed toward the fixing portion is able to pass through, and a closed position at which the shutter closes the opening, an urging portion configured to urge the shutter toward the open position, and an abutment portion that the shutter urged toward the open position by the urging portion abuts to be positioned at the open position.

7 Claims, 13 Drawing Sheets

(56) References Cited

U.S. PATENT DOCUMENTS

| | | | |
|---|---|---|---|
| 2002/0186986 A1 | 12/2002 | Makihira | |
| 2019/0107806 A1 | 4/2019 | Johnson, Jr. et al. | |
| 2019/0163121 A1* | 5/2019 | Wada | G03G 15/2017 |
| 2019/0286023 A1 | 9/2019 | Cho et al. | |
| 2021/0318657 A1 | 10/2021 | Johnson, Jr. | |

FOREIGN PATENT DOCUMENTS

| | | |
|---|---|---|
| JP | 2013224987 A | 10/2013 |
| JP | 2015106126 A | 6/2015 |
| JP | 2019040012 A | 3/2019 |
| JP | 2019095643 A | 6/2019 |

OTHER PUBLICATIONS

Office Action issued in U.S. Appl. No. 17/897,703, mailed on Mar. 28, 2023.
Office Action issued in U.S. Appl. No. 17/897,703, mailed on Jul. 10, 2023.
Notice of Allowance issued in U.S. Appl. No. 17/897,703, mailed on Aug. 28, 2023.

* cited by examiner

IMAGE FORMING APPARATUS AND FIXING UNIT

BACKGROUND OF THE INVENTION

Field of the Invention

The present disclosure relates to an image forming apparatus and a fixing unit.

Description of the Related Art

Conventionally, an image forming apparatus including a fixing portion that heats up to a high temperature, and a fixing frame surrounding the fixing portion is known. This kind of fixing frame typically has an opening that a sheet passes through. Japanese Patent Laid-Open No. 2003-140480 discloses an image forming apparatus including a shutter that opens and closes the opening of the fixing frame such that a finger of a user does not touch the fixing portion through the opening of the fixing frame when the user opens an opening/closing member of the exterior.

However, the shutter disclosed in Japanese Patent Laid-Open No. 2003-140480 is urged toward a closed position where the opening is closed, and therefore the shutter needs to be moved by an interlocking member that moves in an interlocked manner with the opening/closing member. Therefore, it has been difficult to position the shutter with high precision when opening the shutter due to the manufacture tolerance of the interlocking member, the opening/closing member, and the like.

SUMMARY OF THE INVENTION

According to a first aspect of the present invention, an image forming apparatus includes an image forming portion configured to form a toner image on a sheet, a fixing portion configured to heat and pressurize the sheet bearing the toner image to fix the toner image to the sheet, a shutter provided to be movable to an open position at which the shutter opens an opening that the sheet being conveyed toward the fixing portion is able to pass through, and a closed position at which the shutter closes the opening, an urging portion configured to urge the shutter toward the open position, and an abutment portion that the shutter urged toward the open position by the urging portion abuts to be positioned at the open position.

According to a second aspect of the present invention, a fixing unit includes a fixing portion configured to heat and pressurize a sheet bearing a toner image to fix the toner image to the sheet, a shutter provided to be movable to an open position at which the shutter opens an opening that the sheet being conveyed toward the fixing portion is able to pass through, and a closed position at which the shutter closes the opening, an urging portion configured to urge the shutter toward the open position, and an abutment portion that the shutter urged toward the open position by the urging portion abuts to be positioned at the open position.

Further features of the present invention will become apparent from the following description of exemplary embodiments with reference to the attached drawings.

DESCRIPTION OF THE EMBODIMENTS

Embodiments of the present invention will be described in detail below with reference to drawings.

First Embodiment

Figure 1:
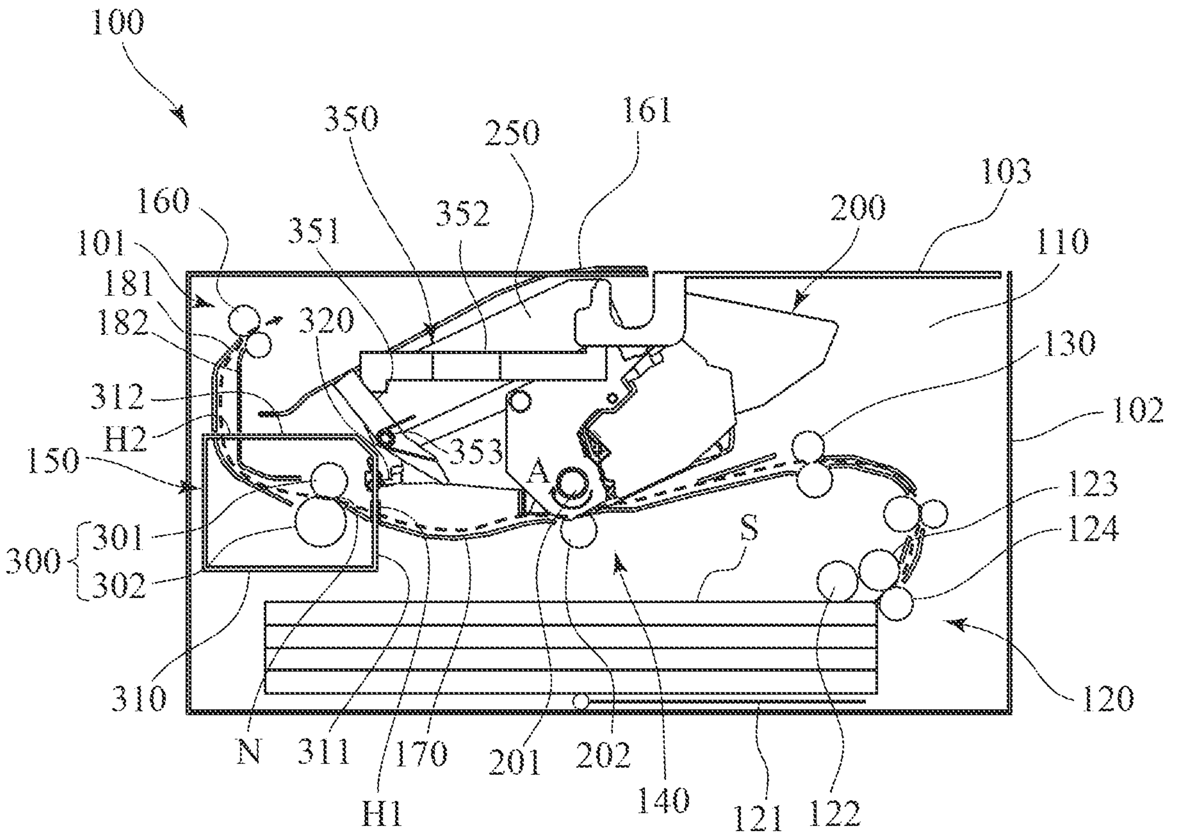
FIG. 1 is a schematic view of a printer serving as an example of an image forming apparatus according to a first embodiment.

FIG. 1 is a schematic longitudinal section view of a printer 100 serving as an example of an image forming apparatus according to a first embodiment. The printer 100 is a laser beam printer of an electrophotographic system that forms a monochromatic toner image.

The printer 100 includes an apparatus body 101, and an exterior 102 covering the apparatus body 101. The apparatus body 101 includes a body frame 110, a sheet feeding portion 120 that feeds a sheet S, and a conveyance roller pair 130 that conveys the sheet S fed by the sheet feeding portion 120. In addition, the apparatus body 101 includes an image forming portion 140 that forms a toner image on the sheet S conveyed by the conveyance roller pair 130, and a fixing unit 150 including a fixing portion 300 that fixes the toner image formed on the sheet S. In addition, the apparatus body 101 includes a discharge roller pair 160 capable of discharging the sheet S onto a discharge tray 161. Examples of the sheet S include recording media such as paper sheets such as plain paper sheets and envelops, plastic films for overhead projectors (overhead transparencies: OHTs), and cloths.

At least part of the exterior 102, which is part of an upper portion of the exterior 102 in the first embodiment, is an opening/closing cover 103 serving as an example of an opening/closing member. The opening/closing cover 103 is supported to be openable and closable in an up-down direction with respect to the body frame 110.

The body frame 110 is a frame body formed from a metal plate and includes a pair of unillustrated side plates. The body frame 110 supports the sheet feeding portion 120, the conveyance roller pair 130, the image forming portion 140, the fixing unit 150, and the discharge roller pair 160 directly, or indirectly via unillustrated members.

When an image formation job is input to the printer 100, an image formation process by the image forming portion 140 is started on the basis of image information input from an external computer or the like connected to the printer 100. The image forming portion 140 includes a process cartridge 200 serving as an example of a cartridge, a laser scanner 250 serving as an example of an exposing portion, and a transfer roller 202 serving as an example of a transfer portion.

The process cartridge 200 is inserted in the body frame 110 along an unillustrated guide so as to be able to be pulled out. The process cartridge 200 is urged by an unillustrated pressing member when being inserted into the body frame 110, thus abuts an unillustrated abutment portion, and is thus positioned with respect to the body frame 110.

In the present embodiment, the process cartridge 200 can be exposed to the outside by opening the opening/closing cover 103, and thus a user can perform an insertion/removal operation of the process cartridge 200. The process cartridge 200 includes a photosensitive drum 201 serving as an image bearing member, and an unillustrated charging unit and an unillustrated developing unit that are disposed around the photosensitive drum 201.

A pair of end portions of the photosensitive drum 201 in the longitudinal direction are rotatably supported by a casing of the process cartridge 200. The driving force of an unillustrated driving motor is transmitted to one end portion of the photosensitive drum 201 via an unillustrated drive transmission mechanism, and thus the photosensitive drum 201 is rotationally driven in an arrow A direction in FIG. 1.

The surface of the photosensitive drum 201 is an organic photoconductor layer, and is uniformly charged by being subjected to a charging bias from an unillustrated charging roller of the charging unit. The laser scanner 250 radiates laser light toward the photosensitive drum 201 on the basis of input image information. The laser light emitted from the laser scanner 250 exposes the surface of the photosensitive drum 201, and thus an electrostatic latent image is formed on the surface of the photosensitive drum 201. An unillustrated developing unit causes toner to attach to the surface of the photosensitive drum 201 on which the electrostatic latent image has been formed, and thus the electrostatic latent image is developed. As a result of this, a monochromatic toner image is formed on the surface of the photosensitive drum 201.

The sheet S is fed from the sheet feeding portion 120 in parallel with the image formation process described above. The sheet feeding portion 120 includes an unillustrated feeding tray, an inner plate 121, a pickup roller 122, a feeding roller 123, and a separation roller 124. The inner plate 121 is supported by the unillustrated feeding tray so as to be able to ascend and descend, and is pushed upward by an unillustrated inner plate lifting/lowering mechanism. The inner plate 121 is pushed up by the unillustrated inner plate lifting/lowering mechanism, and thus the downstream end of the sheet S supported on the inner plate 121 is pushed against the pickup roller 122. In this state, the pickup roller 122 feeds the uppermost sheet S among sheets S supported on the inner plate 121 to the feeding roller 123. The feeding roller 123 is driven at a predetermined timing by an unillustrated driving motor and an unillustrated drive transmission mechanism, and conveys the sheet S fed by the pickup roller 122 to the conveyance roller pair 130. In the case where a plurality of sheets S are fed by the pickup roller 122, the plurality of sheets S are separated by the separation roller 124, and only the uppermost one of the sheets S is conveyed to the conveyance roller pair 130.

The sheet S conveyed to the conveyance roller pair 130 is conveyed by the conveyance roller pair 130 to a transfer nip where the photosensitive drum 201 and the transfer roller 202 abut each other. A predetermined bias voltage is applied by the transfer roller 202 to the sheet S conveyed to the transfer nip, and thus the toner image on the photosensitive drum 201 is transferred onto the sheet S.

The fixing unit 150 includes a fixing frame 310 that supports the fixing portion 300. The fixing frame 310 is attached and fixed to the body frame 110, and is thus supported by the body frame 110. As a result of this, the fixing unit 150 is attachable to and detachable from the body frame 110, and ease of assembly and maintenance of the printer 100 is improved.

The fixing frame 310 includes a front side portion 311 opposing the transfer roller 202, and an upper portion 312 opposing the discharge roller pair 160. An opening H1 that the sheet S can pass through is provided in the front side portion 311 of the fixing frame 310. A conveyance guide 170 extending approximately horizontally is disposed between the transfer roller 202 and the opening H1 of the fixing frame 310. The sheet S onto which the toner image has been transferred is guided to the fixing unit 150 by the conveyance guide 170, leading to the fixing portion 300 through the opening H1.

The fixing portion 300 includes a heating roller 301 and a pressurizing roller 302. The heating roller 301 is heated by a heat source. Examples of the heat source include a heat generating member such as a halogen lamp or a ceramic heater, and a heat generating mechanism of an induction heating system. A fixing nip Nis formed by the heating roller 301 and the pressurizing roller 302 abutting each other. The sheet S onto which the toner image has been transferred is nipped and conveyed to the fixing nip N of the fixing portion 300, and is thus subjected to a predetermined heat and a predetermined pressure. As a result of this, the toner image on the sheet S is melted to adhere, that is, fixed thereto, and thus an image is formed on the sheet S.

An opening H2 that the sheet S can pass through is provided in the upper portion 312 of the fixing frame 310. Conveyance guides 181 and 182 extending approximately vertically are disposed between the opening H2 of the fixing frame 310 and the discharge roller pair 160. The sheet S on which an image has been formed by the fixing portion 300 is conveyed to the outside of the fixing frame 310 through the opening H2, is guided by the conveyance guides 181 and 182 to the discharge roller pair 160, and is discharged onto the discharge tray 161 by the discharge roller pair 160.

To be noted, although the printer 100 of the first embodiment has a configuration capable of only simplex printing in which an image is formed on a first surface of the sheet S, a configuration capable of duplex printing in which images of both the first surface and a second surface of the sheet S may be employed. That is, a configuration in which a duplex conveyance path is provided downstream of the fixing portion 300 in the sheet conveyance direction and the sheet S on the first surface of which an image has been formed is guided to the transfer nip through the duplex conveyance path may be employed.

In addition, although a case where the fixing portion 300 includes the heating roller 301 has been described, the configuration is not limited to this, and a fixing film constituted by a flexible sleeve including an unillustrated heater may be provided instead of the heating roller 301.

Here, when the opening/closing cover 103 is opened and the process cartridge 200 is pulled out from the body frame 110, the transfer roller 202, the conveyance guide 170, and the front side portion 311 of the fixing frame 310 are exposed. As a result of this, the user can easily remove a sheet jammed inside the printer 100.

Figure 2:
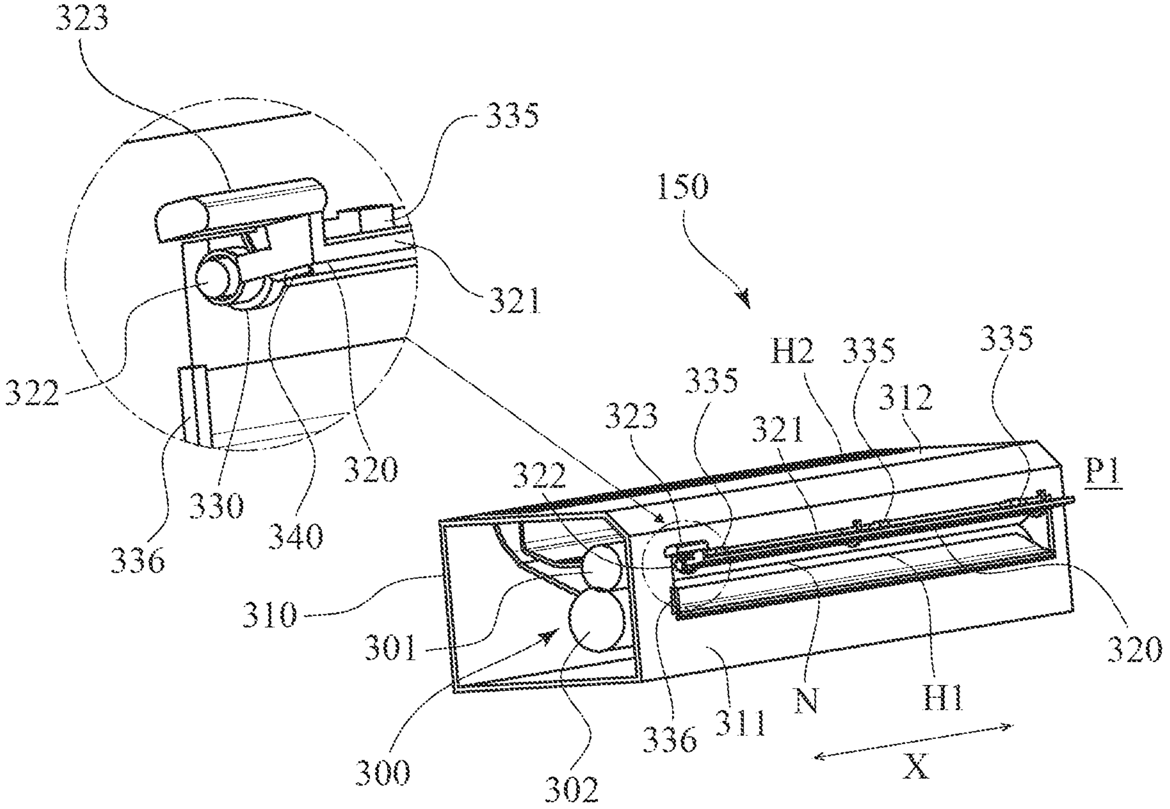
FIG. 2 is a perspective view of a fixing unit according to the first embodiment.
Figure 3A:
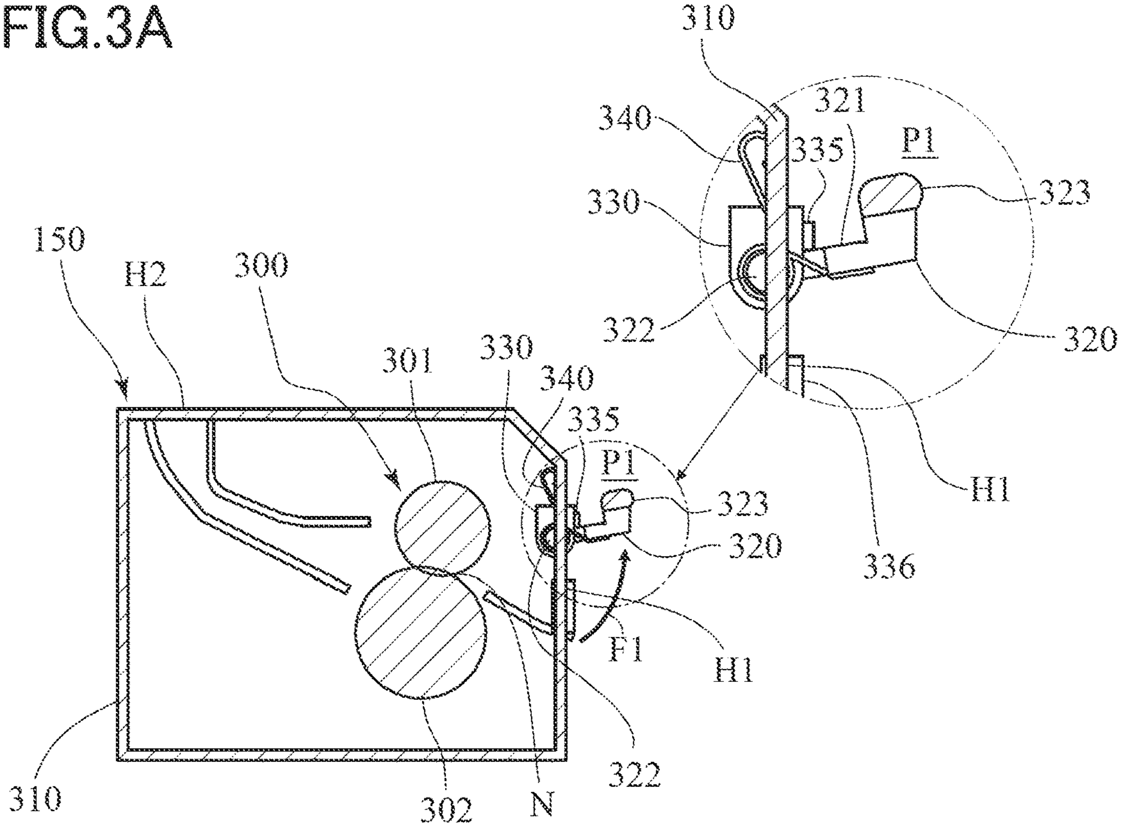
FIG. 3A is a section view of the fixing unit according to the first embodiment.
Figure 3B:
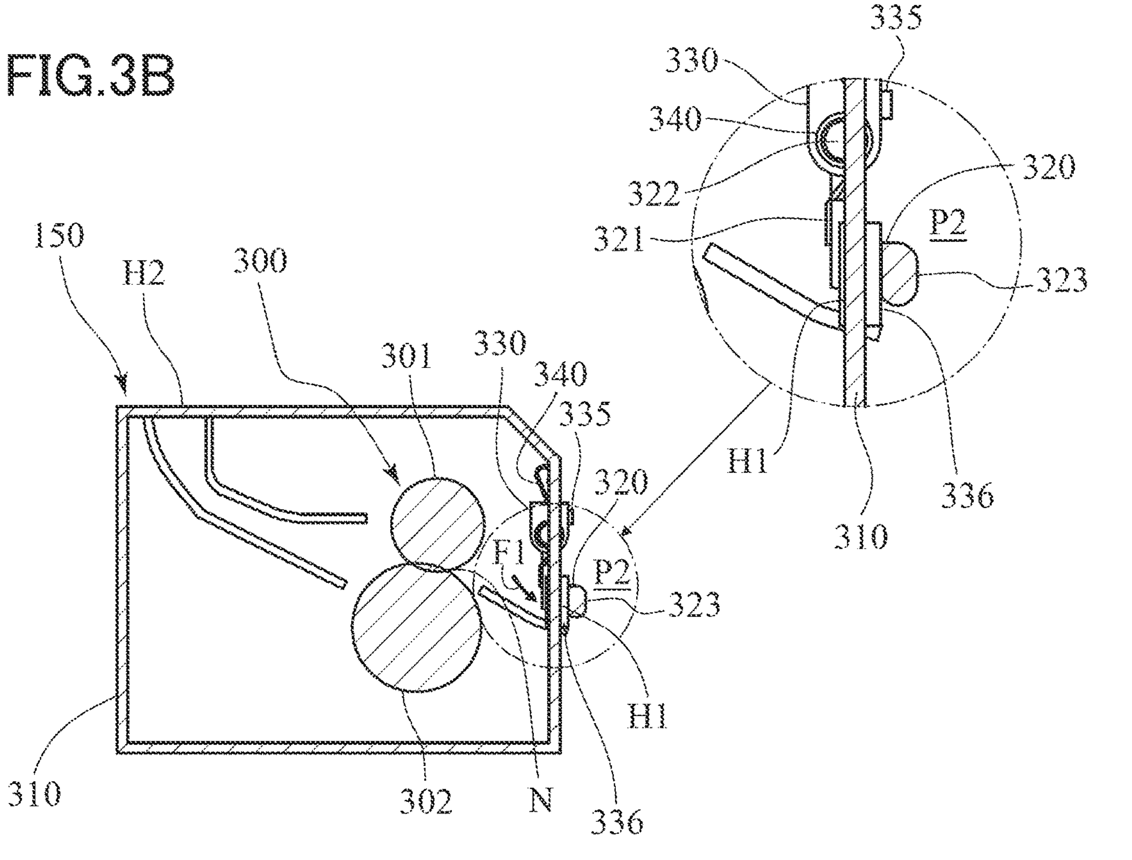
FIG. 3B is a section view of the fixing unit according to the first embodiment.

FIG. 2 is a perspective view of the fixing unit 150 according to the first embodiment. FIGS. 3A and 3B are section views of the fixing unit 150 according to the first embodiment.

The heating roller 301 and the pressurizing roller 302, particularly the heating roller 301, are heated by a heat source such as an unillustrated heater, and therefore have a portion that is heated to a high temperature. The fixing frame 310 is disposed to surround the fixing portion 300. The fixing frame 310 is constituted to include, for example, a metal plate.

The longitudinal direction of the fixing portion 300, that is, the longitudinal direction of the heating roller 301 and the pressurizing roller 302 will be referred to as an X direction. The X direction also serves as a width direction of the sheet S. The fixing portion 300 is disposed inside the fixing frame 310, and both end portions of the fixing portion 300 in the X direction are supported by the fixing frame 310. As described above, the fixing frame 310 has the two openings H1 and H2 that the sheet S can pass through. The opening H1 is provided on the sheet inlet side of the fixing frame 310, and the opening H2 is provided on the sheet outlet side of the fixing frame 310.

The fixing frame 310 surrounding the fixing portion 300 does not mean that the fixing frame 310 seals the fixing portion 300, and means that the fixing frame 310 partially covers the fixing portion 300. That is, the fixing frame 310 may have an opening in addition to the openings H1 and H2, and does not have to cover some part of the fixing portion 300 as long as it is difficult for the user's hand to touch the high-temperature portion of the fixing portion 300. For example, as illustrated in FIG. 2, both end portions of the fixing frame 310 in the X direction may be open. In addition, an opening of a size that the user's finger does not pass through may be provided in the fixing frame 310. In addition, for example, an opening may be provided at a position that the user's hand is difficult to reach in the fixing frame 310. In addition, for example, a gap may be provided between the fixing frame 310 and the body frame 110, and an end portion of the fixing portion 300 in the X direction may be exposed from the fixing frame 310 through the gap.

The openings H1 and H2 are each formed in such a size that both end portions in the X direction of the sheet S of the maximum size among sheets on which image formation can be performed by the printer 100 can pass therethrough without touching the fixing frame 310, and are each an elongated hole having a rectangular shape extending in the X direction in the present embodiment. To be noted, the shapes of the openings H1 and H2 are not limited to this, and for example, end portions of the openings H1 and H2 in the X direction may extend to end portions of the fixing frame 310 in the X direction.

In a state in which the opening/closing cover 103 is open and the process cartridge 200 is pulled out from the body frame 110, the opening H1 is at a position where the user's hand can reach, and the opening H2 is at a position difficult for the user's hand to reach. In the present embodiment, the fixing unit 150 includes a shutter 320 that opens and closes the opening H1. The shutter 320 will be hereinafter referred to as a fixing shutter. To be noted, FIG. 3A illustrates a state in which the fixing shutter 320 is open, and FIG. 3B illustrates a state in which the fixing shutter 320 is closed.

The fixing shutter 320 is provided to be movable to an open position P1 illustrated in FIG. 3A where the fixing shutter 320 opens the opening H1 and a closed position P2 illustrated in FIG. 3B where the fixing shutter 320 closes the opening H1. Here, when the fixing shutter 320 moves to the closed position P2, the entirety of the opening H1 may be covered by the fixing shutter 320, or part of the opening H1 may be not covered by the fixing shutter 320 as long as the user's finger does not enter the opening H1. For example, an end portion of the opening H1 in the X direction does not have to be covered by the fixing shutter 320, or an opening such as a hole or a slit of a size that the user's finger does not pass through may be provided in the fixing shutter 320.

The fixing unit 150 includes a holder 330 that supports the fixing shutter 320 such that the fixing shutter 320 is movable between the open position P1 and the closed position P2. The holder 330 is attached and fixed to the fixing frame 310. As a result of this, the fixing shutter 320 is supported by the body frame 110 via the holder 330 and the fixing frame 310. In the present embodiment, the fixing shutter 320 is pivotably, that is, swingably supported by the holder 330. The fixing shutter 320 can move between the open position P1 and the closed position P2 by pivoting with respect to the holder 330, that is, the fixing frame 310. Specifically, the fixing shutter 320 includes a shutter body 321 extending in the X direction, and a support shaft 322 provided in the shutter body 321. The support shaft 322 is pivotably supported by the holder 330. As a result of this, the fixing shutter 320 is supported by the holder 330 so as to be pivotable about the support shaft 322.

In addition, the fixing unit 150 includes a fixing shutter spring 340 serving as an example of an urging portion, and an abutment portion 335 that the fixing shutter 320 abuts to be positioned at the open position P1. The fixing shutter spring 340 is a spring that urges the fixing shutter 320 toward the open position P1 by an urging force F1, and is a torsion coil spring in the present embodiment. A coil portion of the fixing shutter spring 340 is provided on the support shaft 322, a first end of the fixing shutter spring 340 abuts the shutter body 321 of the fixing shutter 320, and a second end of the fixing shutter spring 340 abuts the fixing frame 310. As a result of this, the urging force F1 of the fixing shutter spring 340 acts on the fixing shutter 320. Further, as illustrated in FIG. 3A, the fixing shutter 320 pivots in the counterclockwise direction by the urging force F1 of the fixing shutter spring 340, and abuts the abutment portion 335.

The abutment portion 335 is fixed to the holder 330 fixed to the fixing frame 310. That is, the abutment portion 335 is indirectly fixed to the fixing frame 310 via the holder 330 by being fixed to the holder 330, and is thus indirectly fixed to the body frame 110 via the holder 330 and the fixing frame 310. As described above, the abutment portion 335 is positioned and fixed by the fixing frame 310, that is, the body frame 110, with high precision. Therefore, the fixing shutter 320 is positioned at the open position P1 with high precision by abutting the abutment portion 335 that is positioned with high precision.

As illustrated in FIG. 3A, by moving the fixing shutter 320 to the open position P1 by the urging force F1 of the fixing shutter spring 340, the fixing nip N of the fixing portion 300 can be exposed to the outside of the fixing frame 310 through the opening H1. Further, as a result of the shutter body 321 of the fixing shutter 320 abutting the abutment portion 335, the fixing shutter 320 is positioned at the open position P1 with high precision. Therefore, a sheet conveyance path wide enough for the sheet S to pass through can be secured in the opening H1 without increasing the size of the printer 100. As a result of this, contact of the sheet S guided to the fixing nip N through the opening H1 with the fixing frame 310 or the fixing shutter 320 in image formation can be reduced. Therefore, jam of the sheet S in the opening H1 and disturbance of the toner image formed on the sheet S can be reduced.

In addition, since the fixing shutter 320 pivots about the support shaft 322 to move to the open position P1 and the closed position P2, the size of the printer 100 can be reduced as compared with a case where the fixing shutter moves to the open position and the closed position by linear movement.

As illustrated in FIG. 3B, the fixing shutter 320 includes an abutting portion 323 provided at an end portion of the shutter body 321 in the X direction. The abutting portion 323 is disposed outside the sheet conveyance path. The fixing frame 310 includes an abutment portion 336 that the abutting portion 323 of the fixing shutter 320 abuts when the fixing shutter 320 moves to the closed position P2. As a result of the abutting portion 323 of the fixing shutter 320 abutting the abutment portion 336, the fixing shutter 320 is positioned at the closed position P2 with high precision. As a result of the fixing shutter 320 moving to the closed position P2, the fixing nip N of the fixing portion 300 is covered by the fixing shutter 320.

In the present embodiment, the printer 100 includes a link mechanism 350 that opens and closes the fixing shutter 320 in an interlocked manner with an opening/closing operation of the opening/closing cover 103 as illustrated in FIG. 1. The link mechanism 350 moves the fixing shutter 320 to the closed position P2 against the urging force F1 of the fixing shutter spring 340 in accordance with the opening operation of the opening/closing cover 103.

Figure 4:
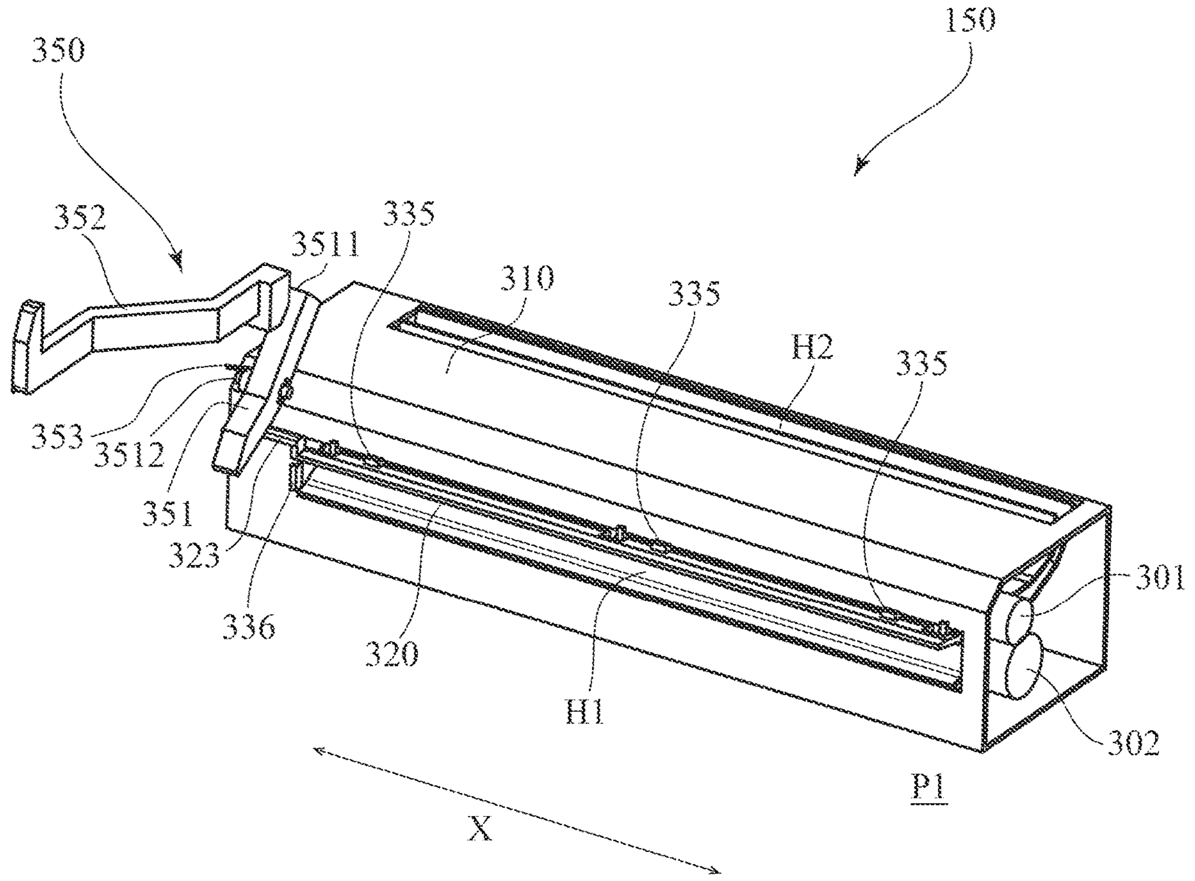
FIG. 4 is a perspective view of a link mechanism and the fixing unit according to the first embodiment.
Figure 5A:
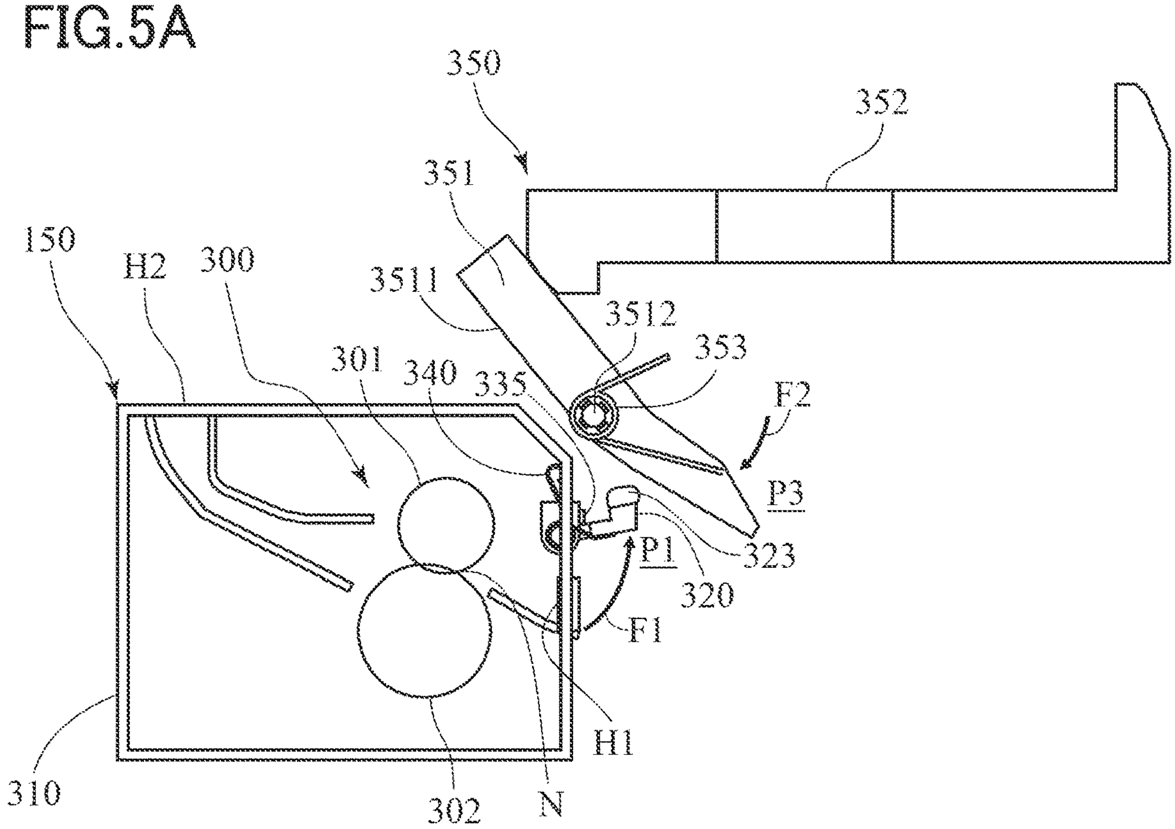
FIG. 5A is a section view of the link mechanism and the fixing unit according to the first embodiment.
Figure 5B:
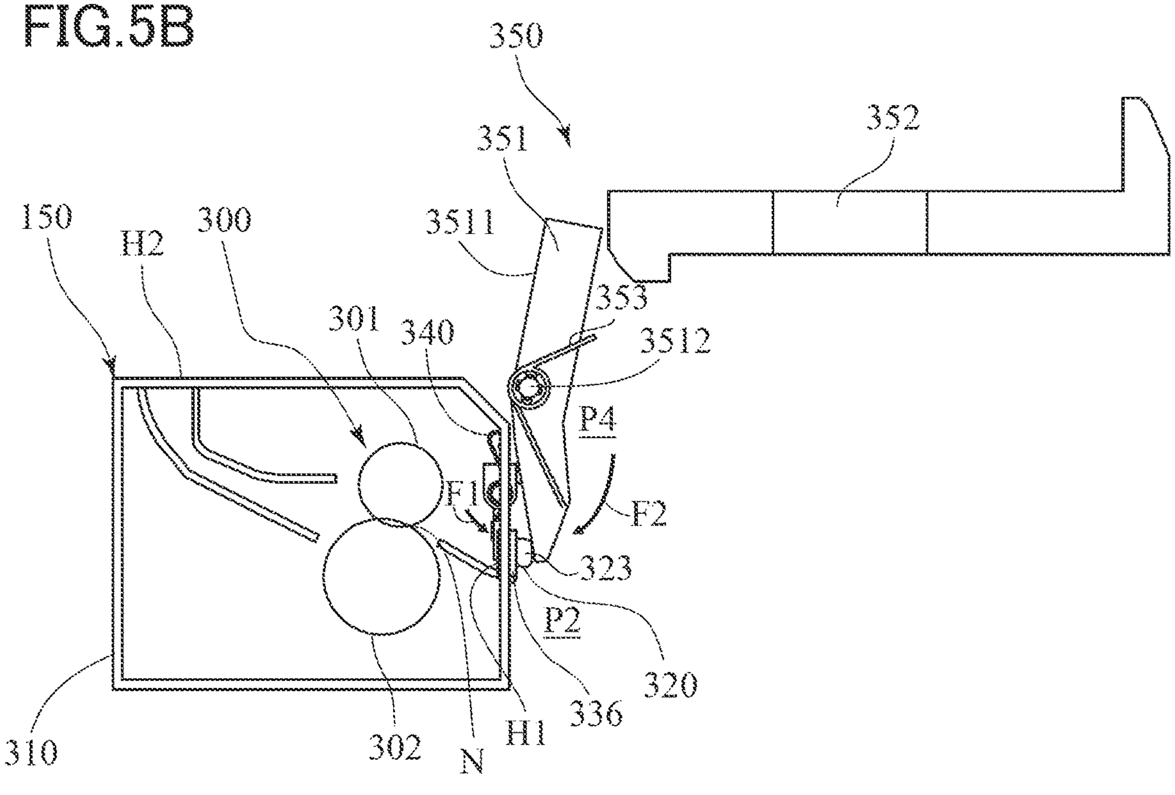
FIG. 5B is a section view of the link mechanism and the fixing unit according to the first embodiment.

FIG. 4 is a perspective view of the link mechanism 350 and the fixing unit 150 according to the first embodiment. FIGS. 5A and 5B are section views of the link mechanism 350 and the fixing unit 150 according to the first embodiment. To be noted, FIG. 5A illustrates a state in which the fixing shutter 320 is open, and FIG. 5B illustrates a state in which the fixing shutter 320 is closed.

The link mechanism 350 is disposed at a position corresponding to the abutting portion 323 of the fixing shutter 320. The link mechanism 350 includes a switching link 351 serving as an example of a first link member, a movable link 352 serving as an example of a second link member, and a switching link spring 353 serving as an example of a link urging portion.

The switching link 351 is provided to be movable to a separation position P3 illustrated in FIG. 5A where the switching link 351 is separated from the abutting portion 323 of the fixing shutter 320, and an abutting position P4 illustrated in FIG. 5B where the switching link 351 abuts the abutting portion 323 of the fixing shutter 320. In the present embodiment, the switching link 351 is pivotably (swingably) supported by an unillustrated holder. The unillustrated holder is fixed to the body frame 110 of FIG. 1. The switching link 351 can move between the separation position P3 of the abutting position P4 by pivoting with respect to the unillustrated holder. Specifically, the switching link 351 includes a link body 3511 and a support shaft 3512 provided in the link body 3511. The support shaft 3512 is pivotably supported by the unillustrated holder. As a result of this, the switching link 351 is supported by the unillustrated holder so as to be pivotable about the support shaft 3512.

The switching link spring 353 is a spring that urges the switching link 351 toward the abutting position P4 by an urging force F2, and is a torsion coil spring in the present embodiment. The urging force F2 of the switching link spring 353 is set to be larger than the urging force F1 of the fixing shutter spring 340. The switching link spring 353 is provided on the support shaft 3512 of the switching link 351.

The movable link 352 is a link member that moves the switching link 351 to the separation position P3 against the urging force F2 of the switching link spring 353 in accordance with a closing operation of the opening/closing cover 103 illustrated in FIG. 1. The movable link 352 is linearly movably supported by an unillustrated holder. The unillustrated holder is fixed to the body frame 110 of FIG. 1. The movable link 352 linearly moves with respect to the unillustrated holder, and thus can abut or be separated from the switching link 351.

As illustrated in FIG. 5A, the movable link 352 abuts and presses the switching link 351, and thus pivots the switching link 351 in a counterclockwise direction serving as a first direction against the urging force F2 of the switching link spring 353 to move the switching link 351 to the separation position P3. As a result of this, the fixing shutter 320 is positioned at the open position P1 by being urged by the fixing shutter spring 340 when the switching link 351 is positioned at the separation position P3. That is, the restriction by the switching link 351 is cancelled, and the fixing shutter 320 pivots in the counterclockwise direction by the urging force F1 of the fixing shutter spring 340 to abut the abutment portion 335, and is thus positioned at the open position P1 with high precision.

In addition, as illustrated in FIG. 5B, when the movable link 352 is separated from the switching link 351, the switching link 351 pivots in a clockwise direction serving as a second direction opposite to the first direction by the urging force F2 of the switching link spring 353 to come into contact with the abutting portion 323. The urging force F2 of the switching link spring 353 is larger than the urging force F1 of the fixing shutter spring 340. Therefore, the switching link 351 presses the abutting portion 323 of the fixing shutter 320 by the urging force F2 of the switching link spring 353 against the urging force F1 of the fixing shutter spring 340, and moves to the abutting position P4 while pivoting the fixing shutter 320 in the clockwise direction. As a result of this, when the switching link 351 is positioned at the abutting position P4, the fixing shutter 320 is pressed by the switching link 351 against the urging force F1 of the fixing shutter spring 340, and is thus positioned at the closed position P2. That is, the fixing shutter 320 pivots about the support shaft 322 in the clockwise direction by the abutting portion 323 being pressed by the switching link 351 that is pivoting. Further, as a result of the switching link 351 pivoting to the abutting position P4, the abutting portion 323 abuts the abutment portion 336, and thus the fixing shutter 320 is positioned at the closed position P2 with high precision.

Figure 6A:
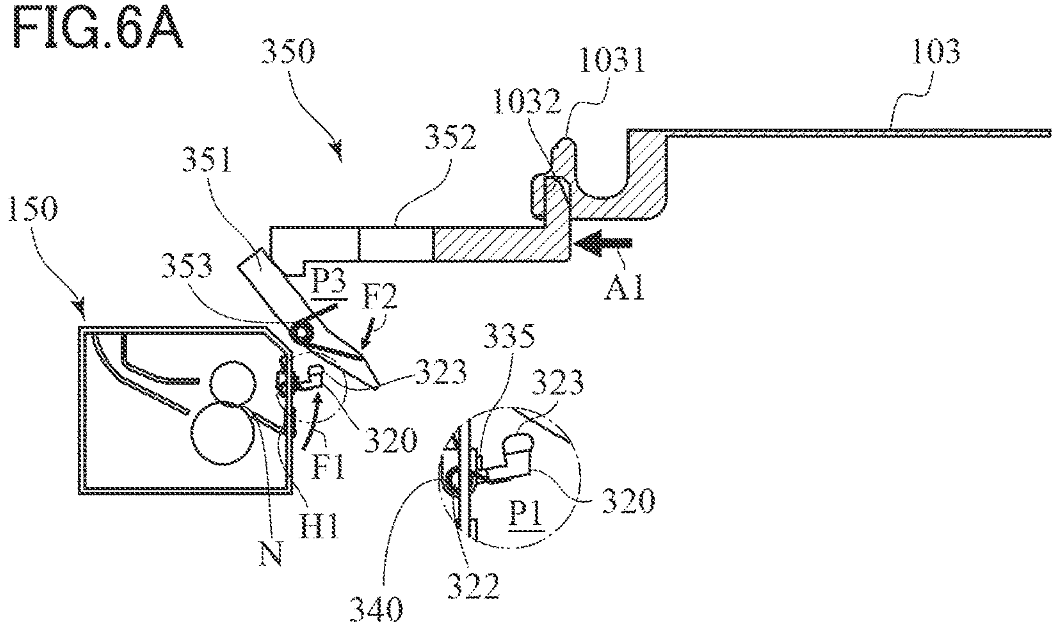
FIG. 6A is a section view of the fixing unit, the link mechanism, and an opening/closing cover according to the first embodiment.
Figure 6B:
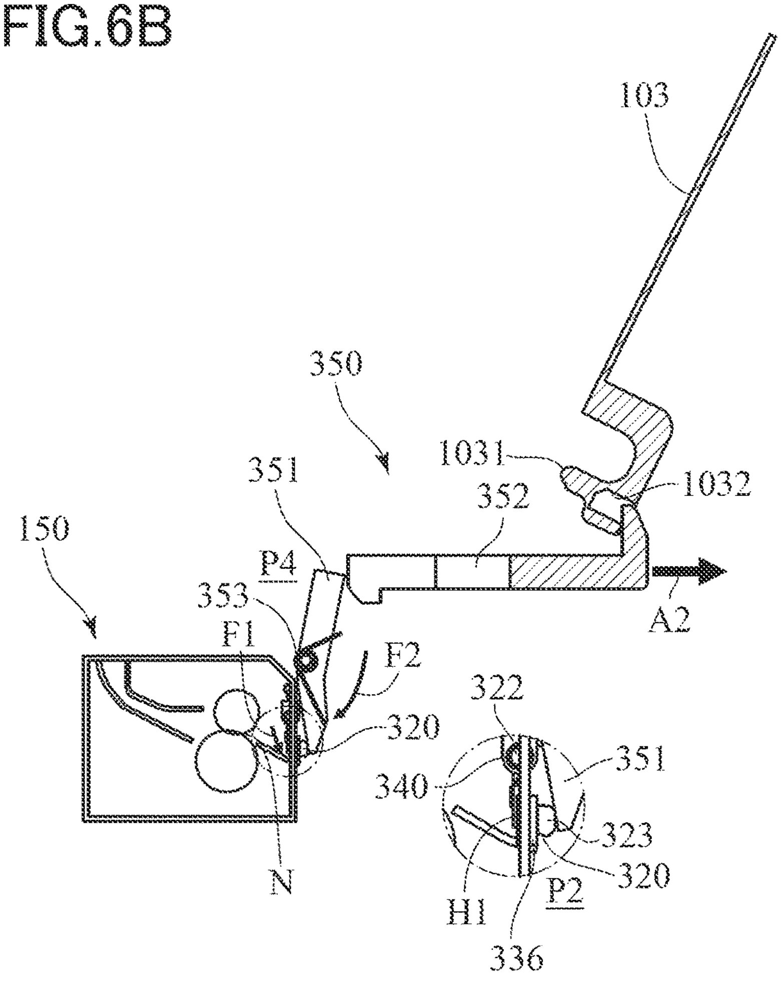
FIG. 6B is a section view of the fixing unit, the link mechanism, and the opening/closing cover according to the first embodiment.

FIGS. 6A and 6B are section views of the fixing unit 150, the link mechanism 350, and the opening/closing cover 103 according to the first embodiment. To be noted, FIG. 6A illustrates a state in which the fixing shutter 320 is open, and FIG. 6B illustrates a state in which the fixing shutter 320 is closed. The opening/closing cover 103 is supported by the body frame 110 so as to be pivotable about a support shaft 1031. The opening/closing cover 103 has a recess portion 1032 that one end portion of the movable link 352 can fit in and be separated from.

As illustrated in FIG. 6A, when the opening/closing cover 103 switches from the open state to the closed state, the one end portion of the movable link 352 fits in the recess portion 1032 of the opening/closing cover 103, and thus the movable link 352 moves in an arrow A1 direction. As a result of the movable link 352 moving in the arrow A1 direction in accordance with the closing operation of the opening/closing cover 103, the movable link 352 abuts the switching link 351, and pivots the switching link 351 in the counterclockwise direction against the urging force F2 of the switching link spring 353. As a result of this, the switching link 351 moves to the separation position P3 where the switching link 351 is separated from the abutting portion 323 of the fixing shutter 320. As a result of the switching link 351 being separated from the fixing shutter 320, the fixing shutter 320 is caused to abut the abutment portion 335 by the urging force F1 of the fixing shutter spring 340, and is thus positioned at the open position P1. As a result of this, the fixing nip N is exposed through the opening H1.

In addition, as illustrated in FIG. 6B, when the opening/closing cover 103 switches from the closed state to the open state, the one end portion of the movable link 352 is separated from the recess portion 1032 of the opening/closing cover 103, and is thus pressed by the opening/closing cover 103 in an arrow A2 direction opposite to the arrow A1 direction. As a result of this, the movable link 352 moves in the arrow A2 direction in accordance with the opening operation of the opening/closing cover 103. As a result of the movable link 352 moving in the arrow A2 direction, the movable link 352 is separated from the switching link 351, and thus the switching link 351 pivots in the clockwise direction by the urging force F2 of the switching link spring 353. As a result of the switching link 351 moving to the abutting position P4 against the urging force F1 of the fixing shutter spring 340, the abutting portion 323 of the fixing shutter 320 abuts the abutment portion 336, and thus the fixing shutter 320 is positioned at the closed position P2. As a result of this, the fixing nip N is covered by the fixing shutter 320.

As described above, according to the first embodiment, the switching link 351 of the link mechanism 350 is separated from the fixing shutter 320 by closing the opening/closing cover 103. Since the fixing shutter 320 is urged toward the open position P1 by the urging force F1 of the fixing shutter spring 340, the fixing shutter 320 pivots to abut the abutment portion 335, and is thus positioned at the open position P1 with high precision.

In addition, the fixing shutter spring 340 provided on the support shaft 322 of the fixing shutter 320 is a member that moves the fixing shutter 320 to the open position P1. Therefore, as compared with a configuration in which the fixing shutter is retracted from the sheet conveyance path by an interlocking member that operates in an interlocked manner with the closing operation of the opening/closing cover, the configuration for retracting the fixing shutter 320 from the sheet conveyance path can be simplified, and the size of the printer 100 can be reduced. In this manner, the fixing shutter 320 can be reliably retracted from the sheet conveyance path even in the case where the size of the printer 100 is reduced.

In addition, in the first embodiment, the urging force F2 of the switching link spring 353 is set to be larger than the urging force F1 of the fixing shutter spring 340. When the user opens the opening/closing cover 103 to remove a jammed sheet or replace the process cartridge 200, the inside of the apparatus body 101 is exposed. In this state, the fixing shutter 320 is positioned at the closed position P2 by the urging force F2 of the switching link spring 353 against the urging force F1 of the fixing shutter spring 340. Therefore, the user's finger touching a high-temperature portion of the fixing portion 300 through the opening H1 can be suppressed.

In addition, in the case where a jam of the sheet has occurred on the upstream side of the fixing portion 300 in a state in which the sheet is nipped in the fixing portion 300, the user performs a jam removing operation of pulling the sheet out through the opening H1. The urging force F1 of the fixing shutter spring 340 assists the pulling force of the user pulling out the jammed sheet, and the urging force F2 of the switching link 351 is relieved by the urging force F1, which facilitates pulling out the jammed sheet. As a result of this, the usability for removing the jam on the upstream side of the fixing portion 300 is improved.

First Modification Example

Figure 7:
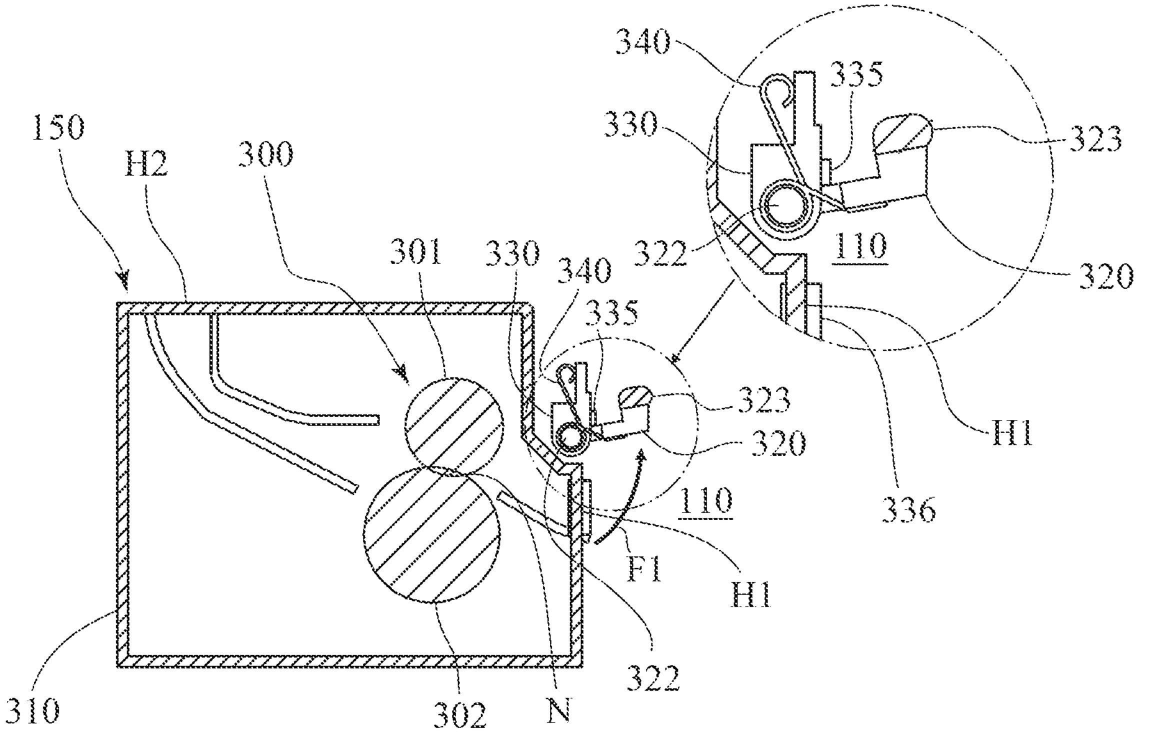
FIG. 7 is a section view of the fixing unit according to a first modification example.

To be noted, although a case where the holder 330 is attached and fixed to the fixing frame 310 has been described in the first embodiment, the configuration is not limited to this. FIG. 7 is a section view of the fixing unit 150 of the first modification example. For example, as illustrated in FIG. 7, the holder 330 to which the abutment portion 335 is fixed may be fixed to the body frame 110. In addition, although illustration thereof is omitted, the abutment portion 335 may be directly attached and fixed to the fixing frame 310 not via the holder 330.

Second Embodiment

Figure 8:
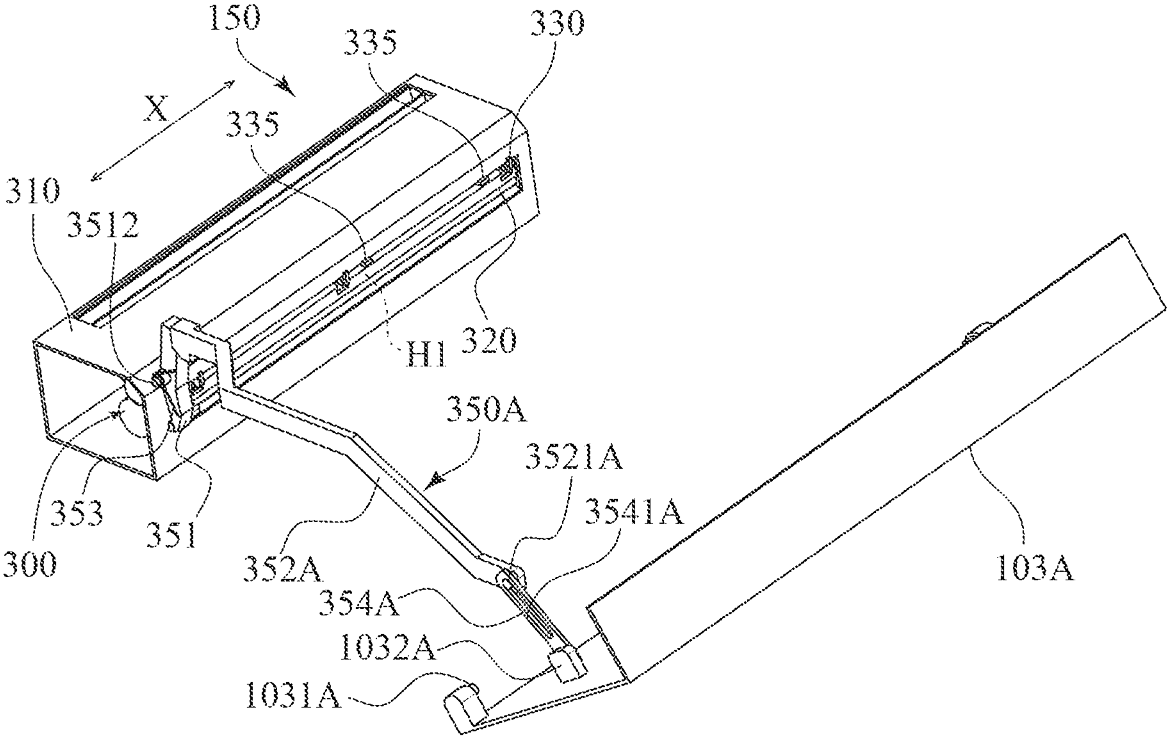
FIG. 8 is a perspective view of a fixing unit, a link mechanism, and a front opening/closing cover of a printer serving as an example of an image forming apparatus according to a second embodiment.
Figure 9A:
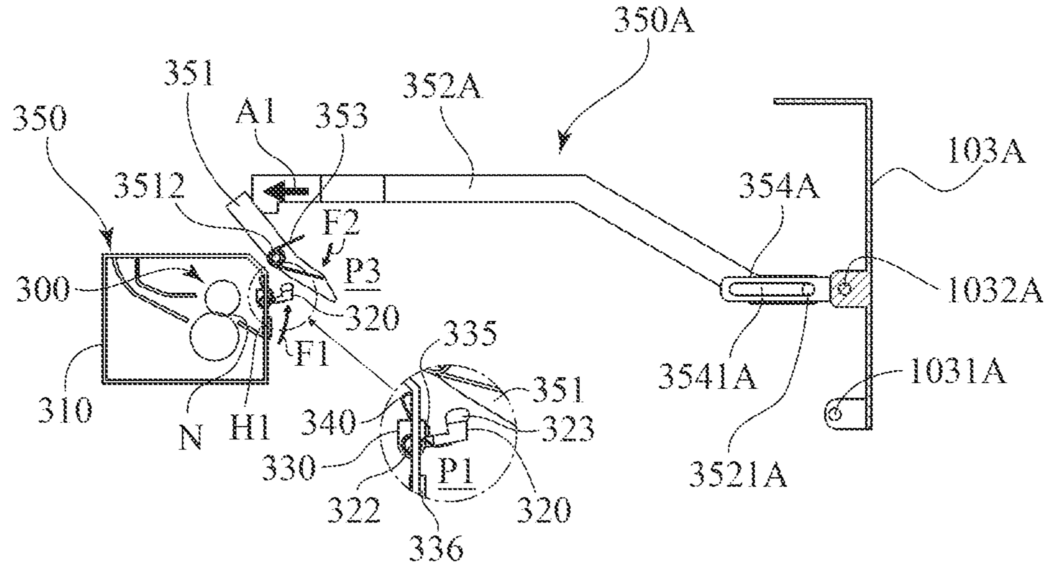
FIG. 9A is a section view of the fixing unit, the link mechanism, and the front opening/closing cover according to the second embodiment.
Figure 9B:
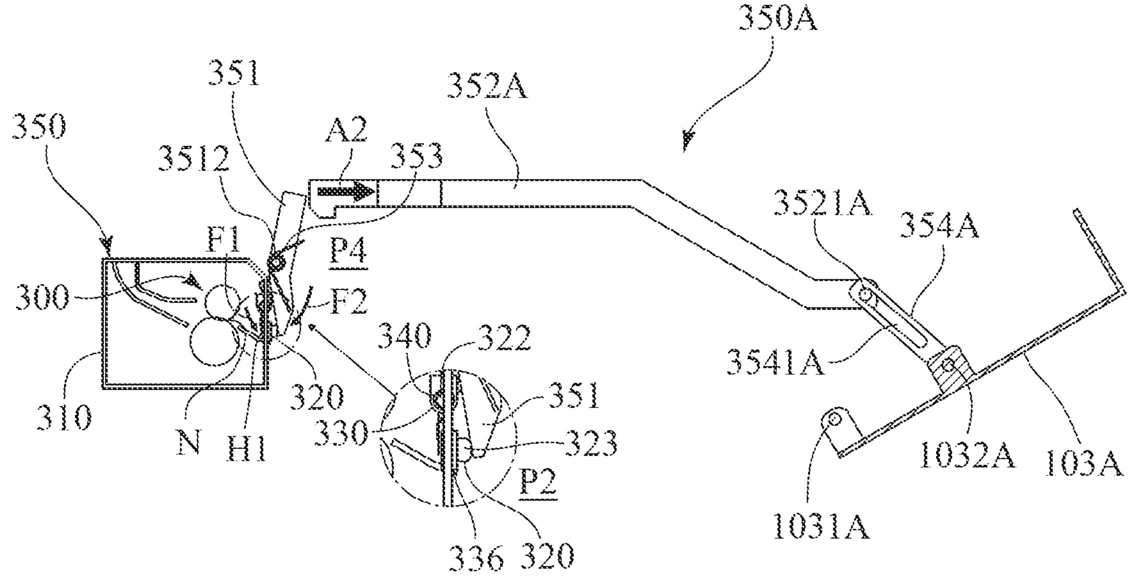
FIG. 9B is a section view of the fixing unit, the link mechanism, and the front opening/closing cover according to the second embodiment.

A printer serving as an example of an image forming apparatus according to a second embodiment will be described. FIG. 8 is a perspective view of the fixing unit 150, a link mechanism 350A, and a front opening/closing cover 103A of the printer serving as an example of the image forming apparatus according to the second embodiment. FIGS. 9A and 9B are section views of the fixing unit 150, the link mechanism 350A, and the front opening/closing cover 103A according to the second embodiment.

In the first embodiment, a configuration in which the fixing shutter 320 of the fixing unit 150 opens and closes the opening H1 in accordance with the opening/closing operation of the opening/closing cover 103 has been described. In the second embodiment, a configuration in which the fixing shutter 320 of the fixing unit 150 opens and closes the opening H1 in accordance with the opening/closing operation of the front opening/closing cover 103A will be described. To be noted, elements other than the front opening/closing cover 103A and the link mechanism 350A in the printer of the second embodiment are substantially the same as the elements other than the opening/closing cover 103 and the link mechanism 350 of the printer 100 of the first embodiment, and therefore the description thereof will be omitted.

The printer of the second embodiment includes the fixing unit 150, the link mechanism 350A, and the front opening/closing cover 103A. The front opening/closing cover 103A serves as an example of an opening/closing member. The front opening/closing cover 103A is a part of the exterior of the printer, and is a front portion of the exterior. The front opening/closing cover 103A is supported so as to be openable and closable with respect to the body frame 110 of FIG. 1.

The fixing unit 150 includes the fixing portion 300, the fixing frame 310, the fixing shutter 320, the fixing shutter spring 340, the holder 330, the abutment portion 335, and the abutment portion 336 as described in the first embodiment. The opening/closing operation of the fixing shutter 320 is the same as that described in the first embodiment. To be noted, FIG. 9A illustrates a state in which the fixing shutter 320 is open, and FIG. 9B illustrates a state in which the fixing shutter 320 is closed.

The front opening/closing cover 103A is supported by the body frame 110 to be pivotable about a support shaft 1031A. The link mechanism 350A includes the switching link 351 and the switching link spring 353 configured as described in the first embodiment. The switching link 351 serves as an example of a first link member, and the switching link spring 353 serves as an example of a link urging portion. In addition, the link mechanism 350A includes a movable link 352A serving as an example of a second link member, and a holding link 354A.

The movable link 352A is a link member that linearly moves in the horizontal direction in an interlocked manner with the opening/closing operation of the front opening/closing cover 103A, and is linearly movably supported by an unillustrated holder. The unillustrated holder is fixed to the body frame 110 of FIG. 1. The movable link 352A linearly moves with respect to the unillustrated holder, and thus can abut or be separated from the switching link 351.

In the second embodiment, a configuration in which the front opening/closing cover 103A being opened or closed linearly moves the movable link 352A via the holding link 354A. The holding link 354A is supported by the support shaft 1032A of the front opening/closing cover 103A to be pivotable about the support shaft 1032A. The holding link 354A has an elongated hole 3541A. A pin 3521A provided at one end portion of the movable link 352A is inserted in the elongated hole 3541A of the holding link 354A so as to be slidable along the elongated hole 3541A of the holding link 354A. As a result of this, the movable link 352A is linearly moved in the horizontal direction in accordance with the opening/closing operation of the front opening/closing cover 103A.

As illustrated in FIG. 9A, the movable link 352A moves in the arrow A1 direction in accordance with the closing operation of the front opening/closing cover 103A. The movable link 352A moving in the arrow A1 direction abuts the switching link 351 to move the switching link 351 to the separation position P3 against the urging force F2 of the switching link spring 353. As a result of this, the fixing shutter 320 is positioned at the open position P1 by being urged by the fixing shutter spring 340 and abutting the abutment portion 335 when the switching link 351 is positioned at the separation position P3. That is, the restriction by the switching link 351 is cancelled, and the fixing shutter 320 pivots by the urging force F1 of the fixing shutter spring 340 to abut the abutment portion 335, and is thus positioned at the open position P1 with high precision. Therefore, a sheet conveyance path wide enough for the sheet to pass through can be secured in the opening H1 without increasing the size of the printer. As a result of this, contact of the sheet guided to the fixing nip N through the opening H1 with the fixing frame 310 or the fixing shutter 320 in image formation can be reduced. Therefore, jam of the sheet in the opening H1 and disturbance of the toner image formed on the sheet can be reduced.

In addition as illustrated in FIG. 9B, the movable link 352A moves in the arrow A2 direction opposite to the arrow A1 direction in accordance with the opening operation of the front opening/closing cover 103A. As a result of the movable link 352A moving in the arrow A2 direction being separated from the switching link 351, the switching link 351 pivots by the urging force F2 of the switching link spring 353. The urging force F2 of the switching link spring 353 is larger than the urging force F1 of the fixing shutter spring 340. Therefore, the switching link 351 presses the abutting portion 323 of the fixing shutter 320 by the urging force F2 of the switching link spring 353 against the urging force F1 of the fixing shutter spring 340, and thus moves to the abutting position P4 while pivoting the fixing shutter 320. As a result of this, when the switching link 351 is positioned at the abutting position P4, the fixing shutter 320 is pressed by the switching link 351 against the urging force F1 of the fixing shutter spring 340, and thus the fixing shutter 320 is positioned at the closed position P2. That is, the fixing shutter 320 is pressed by the switching link 351 to pivot about the support shaft 322 and abuts the abutment portion 336, and is thus positioned at the closed position P2 with high precision. Therefore, the user's finger touching the high-temperature portion of the fixing portion 300 through the opening H1 can be suppressed.

Third Embodiment

Figure 10:
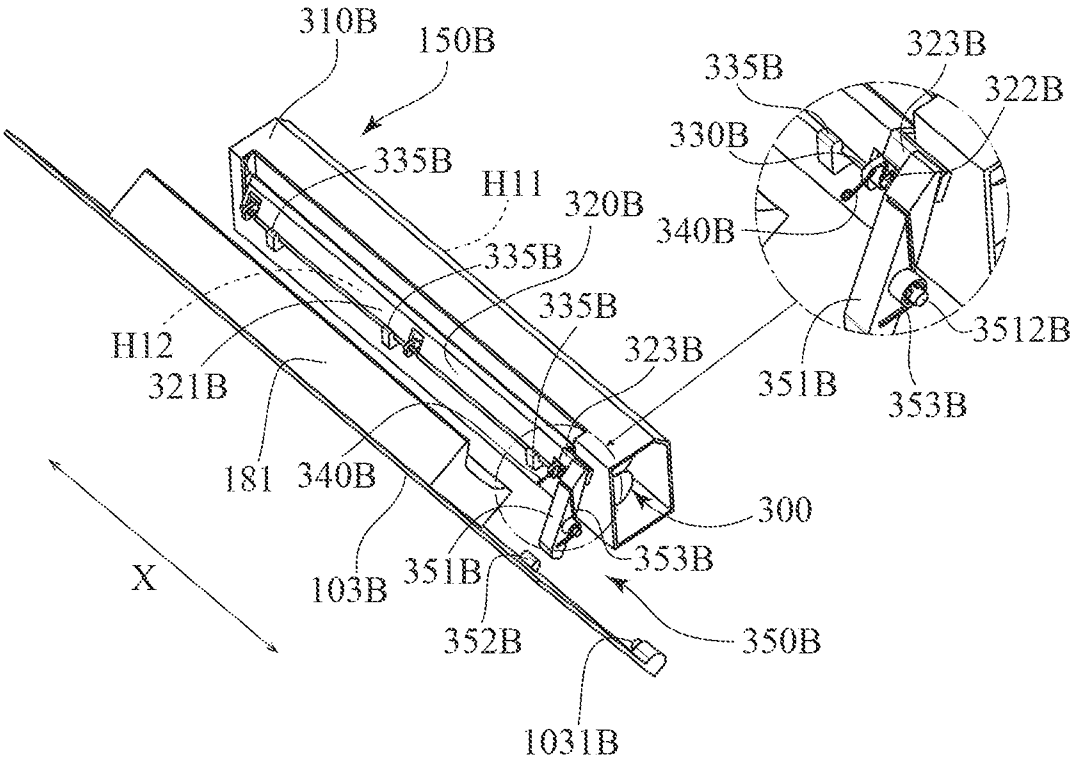
FIG. 10 is a perspective view of a fixing unit, a link mechanism, and a rear opening/closing cover of a printer serving as an example of an image forming apparatus according to a third embodiment.
Figure 11A:
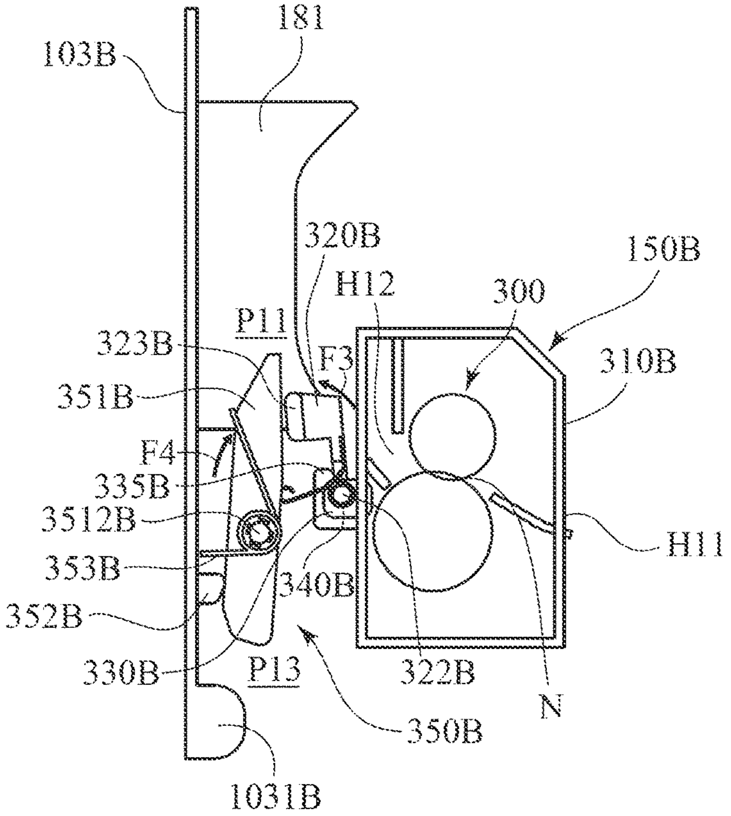
FIG. 11A is a section view of the fixing unit, the link mechanism, and the rear opening/closing cover according to the third embodiment.
Figure 11B:
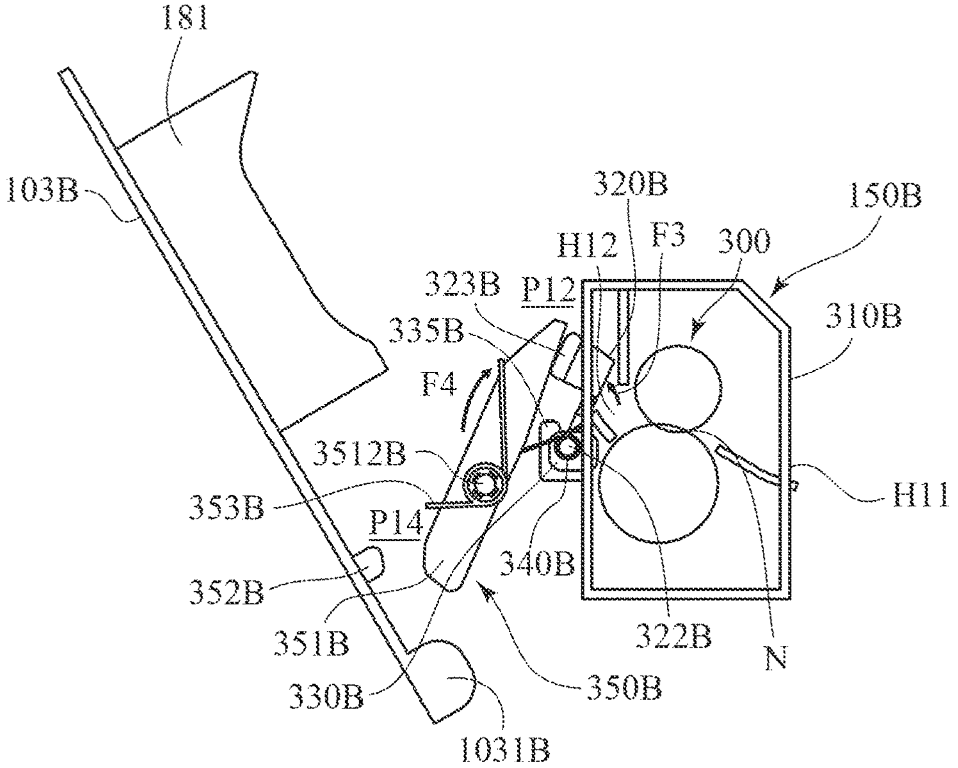
FIG. 11B is a section view of the fixing unit, the link mechanism, and the rear opening/closing cover according to the third embodiment.

A printer serving as an example of an image forming apparatus according to a third embodiment will be described. FIG. 10 is a perspective view of a fixing unit 150B, a link mechanism 350B, and a rear opening/closing cover 103B of the printer serving as an example of the image forming apparatus according to the third embodiment. FIGS. 11A and 11B are section views of the fixing unit 150B, the link mechanism 350B, and the rear opening/closing cover 103B according to the third embodiment.

A configuration in which an opening of the fixing frame on the sheet inlet side is opened and closed has been described in the first and second embodiments. In the third embodiment, a configuration in which an opening of the fixing frame on the sheet outlet side is opened and closed will be described. To be noted, elements other than the fixing unit 150B, the rear opening/closing cover 103B, and the link mechanism 350B in the printer of the third embodiment are substantially the same as the elements other than the fixing unit 150, the opening/closing cover 103, and the link mechanism 350 of the printer 100 of the first embodiment, and therefore the description thereof will be omitted.

The printer of the third embodiment includes the fixing unit 150B, the link mechanism 350B, and the rear opening/closing cover 103B. The rear opening/closing cover 103B serves as an example of an opening/closing member. The fixing unit 150B includes the fixing portion 300 configured as described in the first embodiment. In addition, the fixing unit 150B includes a fixing frame 310B surrounding the fixing portion 300. The fixing frame 310B has an opening H11 on the sheet inlet side and an opening H12 on the sheet outlet side. The rear opening/closing cover 103B is a part of the exterior of the printer, and is a rear portion of the exterior. The rear opening/closing cover 103B is supported by the body frame 110 of FIG. 1 so as to be pivotable about a support shaft 1031B. As a result of this, the rear opening/closing cover 103B pivots about the support shaft 1031B, and is thus openable and closable with respect to the body frame 110 of FIG. 1. In addition, the rear opening/closing cover 103B and the conveyance guide 181 are integrally formed, and the conveyance guide 181 is openable and closable together with the rear opening/closing cover 103B.

When the conveyance guide 181 is opened together with the rear opening/closing cover 103B, the sheet conveyance path defined by the conveyance guide 181 and the conveyance guide 182 of FIG. 1 can be opened. As a result of this, it becomes easier to remove the sheet jammed at the conveyance guides 181 and 182. To suppress the user's finger touching the high-temperature portion of the fixing portion 300 through the opening H12 in the jam removing operation, the fixing unit 150B of the third embodiment includes a fixing shutter 320B that opens and closes the opening H12. To be noted, FIG. 11A illustrates a state in which the fixing shutter 320B is open, and FIG. 11B illustrates a state in which the fixing shutter 320B is closed.

The fixing shutter 320B is provided to be movable to an open position P11 illustrated in FIG. 11A where the fixing shutter 320B opens the opening H12 and a closed position P12 illustrated in FIG. 11B where the fixing shutter 320B closes the opening H12. Here, when the fixing shutter 320B moves to the closed position P12, the entirety of the opening H12 may be covered by the fixing shutter 320B, or part of the opening H12 may be not covered by the fixing shutter 320B as long as the user's finger does not enter the opening H12.

The fixing unit 150B includes a holder 330B that supports the fixing shutter 320B such that the fixing shutter 320B is movable between the open position P11 and the closed position P12. The holder 330B is attached and fixed to the fixing frame 310B. As a result of this, the fixing shutter 320B is supported by the body frame 110 of FIG. 1 via the holder 330B and the fixing frame 310B. In the present embodiment, the fixing shutter 320B is pivotably, that is, swingably supported by the holder 330B. The fixing shutter 320B can move between the open position P11 and the closed position P12 by pivoting with respect to the holder 330B, that is, the fixing frame 310B. Specifically, the fixing shutter 320B includes a shutter body 321B extending in the X direction, and a support shaft 322B provided in the shutter body 321B. The support shaft 322B is pivotably supported by the holder 330B. As a result of this, the fixing shutter 320B is supported by the holder 330B so as to be pivotable about the support shaft 322B.

In addition, the fixing unit 150B includes a fixing shutter spring 340B serving as an example of an urging portion, and an abutment portion 335B that the fixing shutter 320B abuts to be positioned at an open position P11. The fixing shutter spring 340B is a spring that urges the fixing shutter 320B toward the open position P11 by an urging force F3, and is a torsion coil spring in the present embodiment. The fixing shutter spring 340B is provided on the support shaft 322B so as to apply the urging force F3 to the fixing shutter 320B.

The abutment portion 335B is fixed to the holder 330B fixed to the fixing frame 310B. That is, the abutment portion 335B is indirectly fixed to the fixing frame 310B via the holder 330B by being fixed to the holder 330B, and is thus indirectly fixed to the body frame 110 via the holder 330B and the fixing frame 310B. As described above, the abutment portion 335B is positioned and fixed by the fixing frame 310B, that is, the body frame 110, with high precision. Therefore, the fixing shutter 320B is positioned at the open position P11 with high precision by abutting the abutment portion 335B that is positioned with high precision. To be noted, the abutment portion 335B may be directly provided on the fixing frame 310B.

In addition, the fixing shutter 320B includes an abutting portion 323B provided at an end portion of the shutter body 321B in the X direction. The link mechanism 350B is disposed at a position corresponding to the abutting portion 323B. The link mechanism 350B includes a switching link 351B serving as an example of a first link member, a pressing portion 352B serving as an example of a second link member, and a switching link spring 353B serving as an example of a link urging portion.

The switching link 351B is provided to be movable to a separation position P13 illustrated in FIG. 11A where the switching link 351B is separated from the abutting portion 323B of the fixing shutter 320B, and an abutting position P14 illustrated in FIG. 11B where the switching link 351B abuts the abutting portion 323B of the fixing shutter 320B. In the present embodiment, the switching link 351B is pivotably (swingably) supported by an unillustrated holder. The unillustrated holder is fixed to the body frame 110 of FIG. 1. The switching link 351B can move between the separation position P13 of the abutting position P14 by pivoting with respect to the unillustrated holder. Specifically, the switching link 351B includes a support shaft 3512B pivotably supported by the unillustrated holder.

The switching link spring 353B is a spring that urges the switching link 351B toward the abutting position P14 by an urging force F4, and is a torsion coil spring in the present embodiment. The urging force F4 of the switching link spring 353B is set to be larger than the urging force F3 of the fixing shutter spring 340B. The switching link spring 353B is provided on the support shaft 3512B of the switching link 351B.

The pressing portion 352B is a link member that moves the switching link 351B to the separation position P13 against the urging force F4 of the switching link spring 353B in accordance with a closing operation of the rear opening/closing cover 103B. The pressing portion 352B is fixed to the rear opening/closing cover 103B. The pressing portion 352B abuts or is separated from the switching link 351B when the rear opening/closing cover 103B is opened or closed.

As illustrated in FIG. 11A, when the rear opening/closing cover 103B is closed, the pressing portion 352B abuts the switching link 351B, and thus moves the switching link 351B to the separation position P13 against the urging force F4 of the switching link spring 353B. As a result of this, the fixing shutter 320B abuts the abutment portion 335B and positioned at the open position P11 by being urged by the fixing shutter spring 340B when the switching link 351B is positioned at the separation position P13. That is, the restriction by the switching link 351B is cancelled, and the fixing shutter 320B pivots by the urging force F3 of the fixing shutter spring 340B to abut the abutment portion 335B, and is thus positioned at the open position P11 with high precision. As a result of this, the sheet guided out of the fixing nip N through the opening H12 touching the fixing frame 310B or the fixing shutter 320B can be suppressed. Therefore, occurrence of a jam of the sheet in the opening H12 can be suppressed.

In addition, as illustrated in FIG. 11B, when the rear opening/closing cover 103B is opened, the pressing portion 352B is separated from the switching link 351B. As a result of this, the switching link 351B pivots by the urging force F4 of the switching link spring 353B to abut the abutting portion 323B of the fixing shutter 320B. The urging force F4 of the switching link spring 353B is larger than the urging force F3 of the fixing shutter spring 340B. Therefore, the switching link 351B presses the abutting portion 323B of the fixing shutter 320B by the urging force F4 of the switching link spring 353B against the urging force F3 of the fixing shutter spring 340B, and moves to the abutting position P14 while pivoting the fixing shutter 320B. As a result of this, when the switching link 351B is positioned at the abutting position P14, the fixing shutter 320B is pressed by the switching link 351B against the urging force F3 of the fixing shutter spring 340B, and is thus positioned at the closed position P12. That is, the fixing shutter 320B pivots about the support shaft 322B in the clockwise direction to abut the abutment portion 336B by being pressed by the switching link 351B, and is thus positioned at the closed position P12 with high precision.

In this manner, the fixing shutter 320B pivots about the support shaft 322B to move to the open position P11 and the closed position P12, and therefore the size of the printer can be reduced as compared with the case where the fixing shutter moves to the open position and the closed position by linear movement.

As described above, according to the third embodiment, the switching link 351B of the link mechanism 350B is separated from the fixing shutter 320B by closing the rear opening/closing cover 103B. Since the fixing shutter 320B is urged toward the open position P11 by the urging force F3 of the fixing shutter spring 340B, the fixing shutter 320B pivots to abut the abutment portion 335B, and is thus positioned at the open position P11 with high precision.

In addition, the fixing shutter spring 340B provided on the support shaft 322B of the fixing shutter 320B is a member that moves the fixing shutter 320B to the open position P11. Therefore, as compared with a configuration in which the fixing shutter is retracted from the sheet conveyance path by an interlocking member that operates in an interlocked manner with the closing operation of the opening/closing cover, the configuration for retracting the fixing shutter 320B from the sheet conveyance path can be simplified, and the size of the printer can be reduced. In this manner, the fixing shutter 320B can be reliably retracted from the sheet conveyance path even in the case where the size of the printer is reduced.

In addition, in the third embodiment, the urging force F4 of the switching link spring 353B is set to be larger than the urging force F3 of the fixing shutter spring 340B. When the user opens the rear opening/closing cover 103B to remove a jammed sheet, the sheet conveyance path constituted by the conveyance guide 108 is exposed. In this state, the fixing shutter 320B is positioned at the closed position P12 by the urging force F4 of the switching link spring 353B against the urging force F3 of the fixing shutter spring 340B. Therefore, the user's finger touching a high-temperature portion of the fixing portion 300 through the opening H12 can be suppressed.

In addition, in the case where a jam of the sheet has occurred on the downstream side of the fixing portion 300 in a state in which the sheet is nipped in the fixing portion 300, the user performs a jam removing operation of pulling the sheet out through the opening H12. The urging force F3 of the fixing shutter spring 340B assists the pulling force of the user pulling out the jammed sheet, and the urging force F4 of the switching link 351B is relieved by the urging force F3, which facilitates pulling out the jammed sheet. As a result of this, the usability for removing the jam on the downstream side of the fixing portion 300 is improved.

Fourth Embodiment

Figure 12:
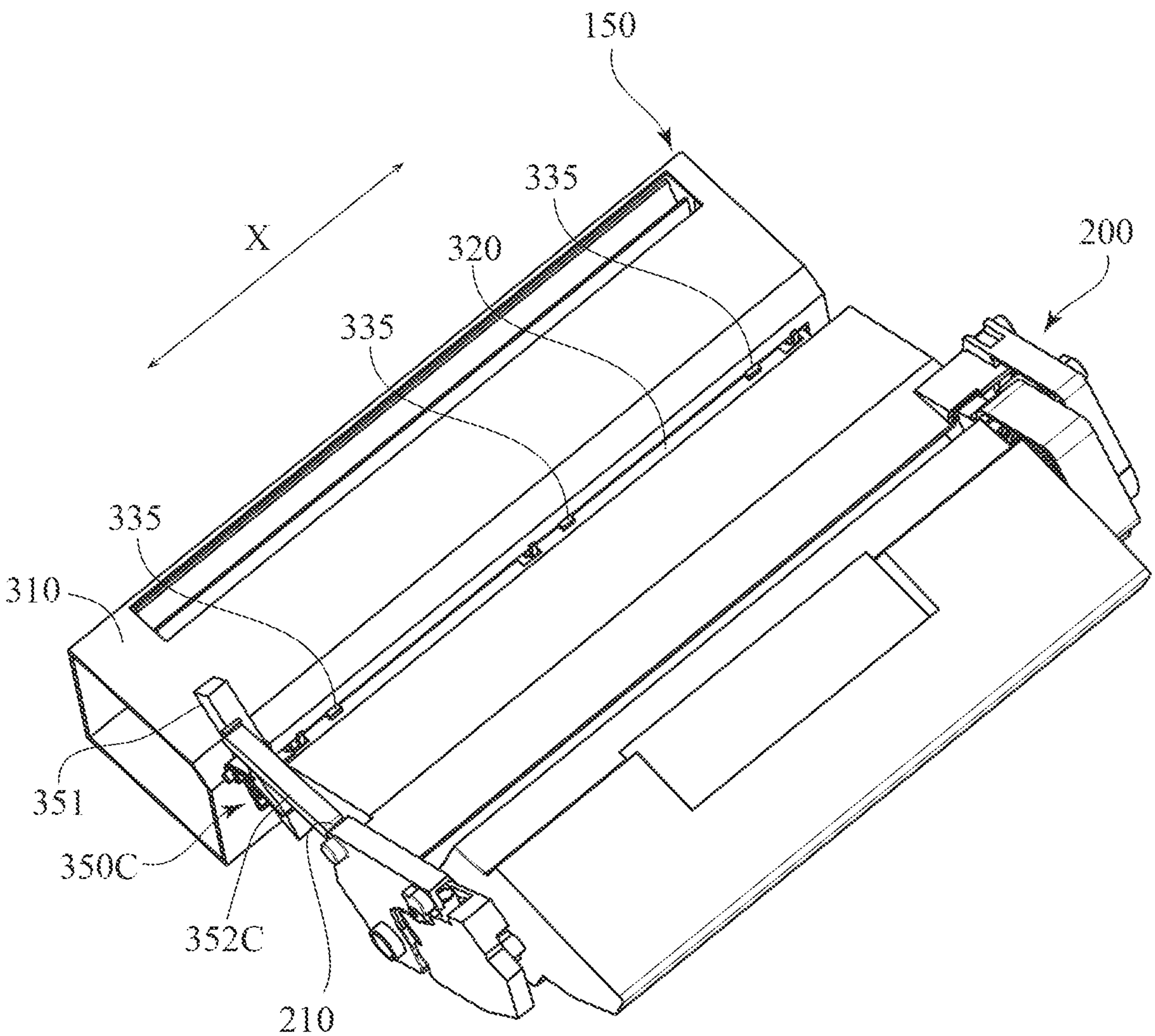
FIG. 12 is a perspective view of a fixing unit, a link mechanism, and a process cartridge of a printer serving as an example of an image forming apparatus according to a fourth embodiment.
Figure 13A:
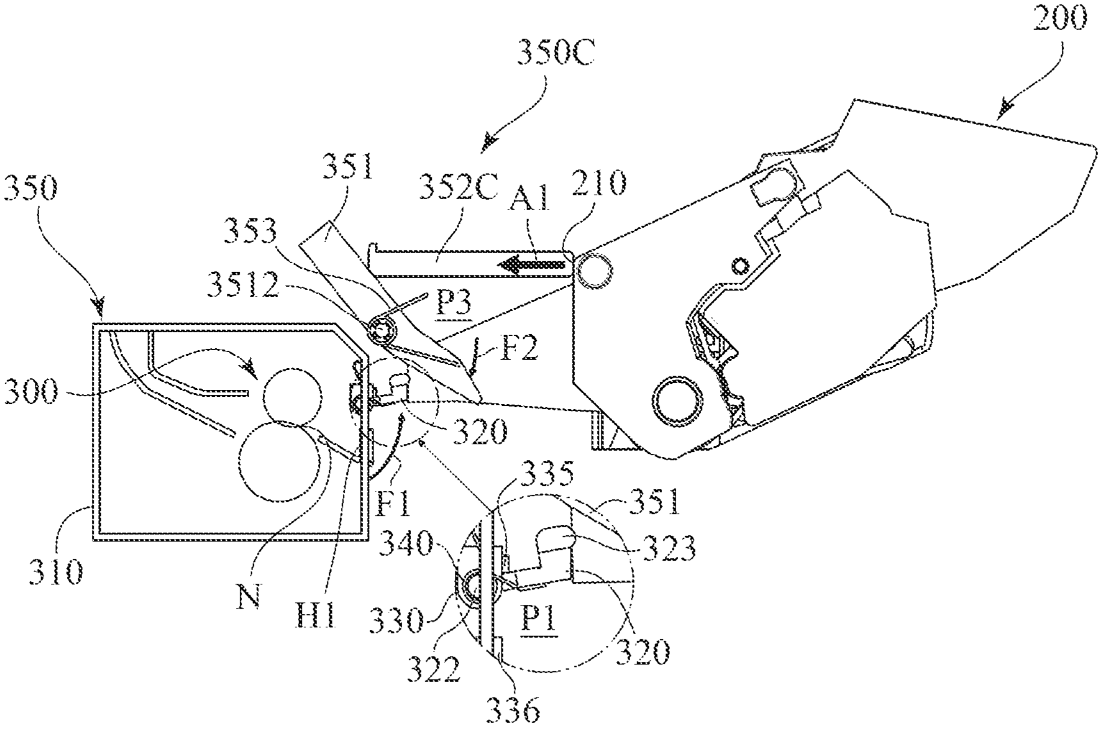
FIG. 13A is a perspective view of the fixing unit, the link mechanism, and the process cartridge according to the fourth embodiment.
Figure 13B:
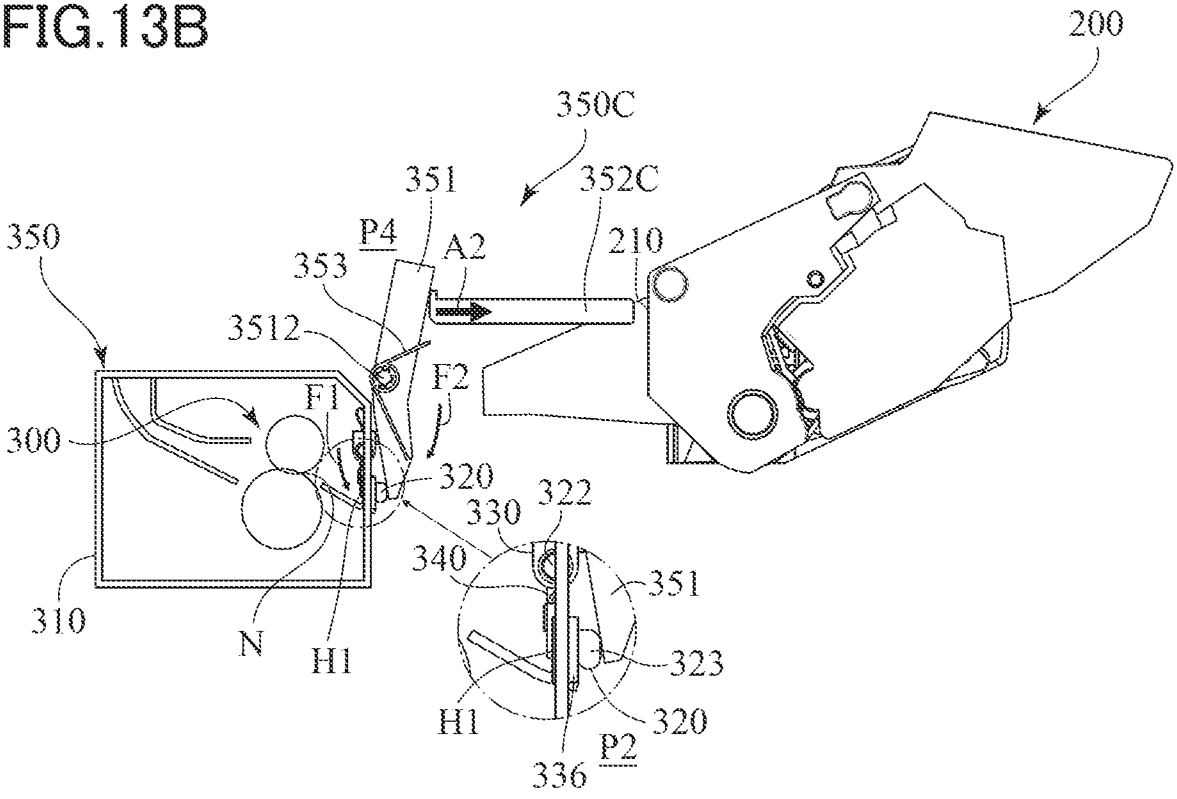
FIG. 13B is a perspective view of the fixing unit, the link mechanism, and the process cartridge according to the fourth embodiment.

A printer serving as an example of an image forming apparatus according to a fourth embodiment will be described. FIG. 12 is a perspective view of the fixing unit 150, a link mechanism 350C, and a process cartridge 200 of the printer serving as an example of the image forming apparatus according to the fourth embodiment. FIGS. 13A and 13B are section views of the fixing unit 150, the link mechanism 350C, and the process cartridge 200 according to the fourth embodiment.

In the first to third embodiments, a configuration in which the fixing shutter is moved in an interlocked manner with the opening/closing operation of the opening/closing member has been described. In the fourth embodiment, a configuration in which the fixing shutter 320 is moved in an interlocked manner with the insertion/removal operation of the process cartridge 200 will be described. To be noted, elements other than the link mechanism 350C in the printer of the fourth embodiment are substantially the same as the elements other than the link mechanism 350 of the printer 100 of the first embodiment, and therefore the description thereof will be omitted.

The printer of the fourth embodiment includes the fixing unit 150, the process cartridge 200, and the link mechanism 350C. The configuration of the fixing unit 150 and the process cartridge 200 is the same as that described in the first embodiment.

The link mechanism 350C includes the switching link 351 and the switching link spring 353. The switching link 351 serves as an example of a first link member. The switching link spring 353 serves as an example of a link urging portion. The configuration of the switching link 351 and the switching link spring 353 is as described in the first embodiment. That is, the switching link 351 is supported by an unillustrated holder so as to be movable to the separation position P3 where the switching link 351 is separated from the fixing shutter 320 and the abutting position P4 where the switching link 351 abuts the fixing shutter 320. The switching link spring 353 is a spring that urges the switching link 351 toward the abutting position P4. The urging force F2 of the switching link spring 353 is larger than the urging force F1 of the fixing shutter spring 340. Further, the fixing shutter 320 is positioned at the open position P1 by being urged by the fixing shutter spring 340 when the switching link 351 is positioned at the separation position P3. In addition, when the switching link 351 is positioned at the abutting position P4, the fixing shutter 320 is pressed by the switching link 351 against the urging force F1 of the fixing shutter spring 340, and is thus positioned at the closed position P2.

In addition, the link mechanism 350C includes a movable link 352C serving as an example of a second link member.

The movable link 352C is a link member that moves the switching link 351 to the separation position P3 against the urging force F2 of the switching link spring 353 in accordance with an operation of inserting the process cartridge 200 into the body frame 110. The process cartridge 200 includes a pressing portion 210 disposed at a position corresponding to the link mechanism 350C. The pressing portion 210 is part of a side plate included in a casing of the process cartridge 200.

When the process cartridge 200 is inserted into the body frame 110, the pressing portion 210 of the process cartridge 200 abuts the movable link 352C and presses the movable link 352C in an arrow A1 direction as illustrated in FIG. 13A. Then, the movable link 352C moves in the arrow A1 direction to abut the switching link 351, and presses the switching link 351. The switching link 351 pivots in a counterclockwise direction in FIG. 13A against the urging force F2 of the switching link spring 353. As a result of this, the switching link 351 is separated from the abutting portion 323 of the fixing shutter 320, and thus the fixing shutter 320 pivots in the counterclockwise direction in FIG. 13A by the urging force F1 of the fixing shutter spring 340. Then, the fixing shutter 320 abuts the abutment portion 335, and is thus positioned at the open position P1. As a result of the fixing shutter 320 being positioned at the open position P1, the fixing nip N of the fixing portion 300 is exposed through the opening H1.

In addition, when the process cartridge 200 is pulled out from the body frame 110, the pressing portion 210 of the process cartridge 200 is separated from the movable link 352C as illustrated in FIG. 13B. As a result of this, the switching link 351 pivots in a clockwise direction in FIG. 13B by the urging force F2 of the switching link spring 353, and the movable link 352C is pressed by the switching link 351 to move in an arrow A2 direction. Then, the switching link 351 abuts the abutting portion 323 of the fixing shutter 320 to press the fixing shutter 320, and pivots in the clockwise direction until the abutting portion 323 of the fixing shutter 320 abuts the abutment portion 336. Then, as a result of the abutting portion 323 abutting the abutment portion 336, the fixing shutter 320 is positioned at the closed position P2. As a result of the fixing shutter 320 being positioned at the closed position P2, the fixing nip N of the fixing portion 300 is covered by the fixing shutter 320.

As described above, according to the fourth embodiment, the switching link 351 of the link mechanism 350C is separated from the fixing shutter 320 by inserting the process cartridge 200 into the body frame 110. Since the fixing shutter 320 is urged toward the open position P1 by the urging force F1 of the fixing shutter spring 340, the fixing shutter 320 pivots to abut the abutment portion 335, and is thus positioned at the open position P1 with high precision.

In addition, the fixing shutter spring 340 provided on the support shaft 322 of the fixing shutter 320 is a member that moves the fixing shutter 320 to the open position P1. Therefore, as compared with a configuration in which the fixing shutter is retracted from the sheet conveyance path by an interlocking member that operates in an interlocked manner with the insertion/removal operation of the process cartridge, the configuration for retracting the fixing shutter 320 from the sheet conveyance path can be simplified, and the size of the printer can be reduced. In this manner, the fixing shutter 320 can be reliably retracted from the sheet conveyance path even in the case where the size of the printer is reduced.

In addition, in the fourth embodiment, the urging force F2 of the switching link spring 353 is set to be larger than the urging force F1 of the fixing shutter spring 340. When the user pulls out the process cartridge 200 from the body frame 110, the fixing unit 150 is exposed. In this state, the fixing shutter 320 is positioned at the closed position P2 by the urging force F2 of the switching link spring 353 against the urging force F1 of the fixing shutter spring 340. Therefore, the user's finger touching a high-temperature portion of the fixing portion 300 through the opening H1 can be suppressed.

In addition, in the case where a jam of the sheet has occurred on the upstream side of the fixing portion 300 in a state in which the sheet is nipped in the fixing portion 300, the user performs a jam removing operation of pulling the sheet out through the opening H1. The urging force F1 of the fixing shutter spring 340 assists the pulling force of the user pulling out the jammed sheet, and the urging force F2 of the switching link 351 is relieved by the urging force F1, which facilitates pulling out the jammed sheet. As a result of this, the usability for removing the jam on the upstream side of the fixing portion 300 is improved.

According to the present disclosure, the shutter can be positioned with high precision when opening the shutter.

The present invention is not limited to the embodiments described above, and can be modified in many ways within the technical concept of the present invention. In addition, the effects described in the embodiments are merely enumeration of the most preferable effects that can be obtained from the present invention, and the effects of the present invention are not limited to those described in the embodiments.

Although a monochromatic printer of an electrophotographic system has been described as an example of the image forming apparatus in the embodiments described above, the present invention is not limited to this. For example, the present invention may be applied to a full-color printer of an electrophotographic system including a plurality of process cartridges. In addition, the present invention may be applied to copiers, facsimile apparatuses, multifunctional apparatuses having functions of these, and the like in addition to printers.

In addition, although a case where the image forming apparatus is of an electrophotographic system has been described in the embodiments described above, the present invention is not limited to this. For example, the present invention may be applied to an image forming apparatus of an electrostatic recording system or a magnetic recording system.

In addition, although a case where the cartridge that is insertable into and removable from the body frame has been described in the embodiments described above, the present invention is not limited to this. For example, the present invention can be also applied to a case where the cartridge is a toner cartridge that supplies toner to a developing unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-150220, filed Sep. 15, 2021, which is hereby incorporated by reference herein in its entirety.

What is claimed is:

1. An image forming apparatus comprising:

an image forming unit configured to form a toner image on a sheet; and a fixing unit having an opening portion, the fixing unit being configured to receive a sheet conveyed along a sheet conveyance path from the image forming unit via the opening portion, the fixing unit being configured to heat the sheet bearing the toner image in a fixing nip to fix the toner image to the sheet wherein the fixing unit includes:

a fixing shutter pivotable to a closed position at which the fixing shutter closes the opening portion and an open position at which the fixing shutter opens an opening portion, the fixing shutter being urged toward the open position by a first urging force, an abutment portion that the fixing shutter urged by the first urging force abuts to be positioned at the open position, an opening/closing cover configured to be opened to expose the sheet conveyance path and allow a sheet to be removed from the sheet conveyance path, and a link mechanism configured to be separated from the fixing shutter to maintain the fixing shutter in the open position when the opening/closing cover is closed, the link mechanism being configured to abut the fixing shutter to move the fixing shutter to the closed position against the first urging force by a second urging force greater than the first urging force when the opening/closing cover is opened.

2. The image forming apparatus according to claim 1, further comprising:

a fixing frame in which the opening portion is provided; and a holder attached to the fixing frame, wherein the abutment portion is fixed to the fixing frame via the holder.

3. The image forming apparatus according to claim 2, wherein the fixing shutter is supported by the fixing frame via the holder.

4. The image forming apparatus according to claim 1, wherein the link mechanism includes a first link member movable to a separation position where the first link member is separated from the fixing shutter, and an abutting position where the first link member abuts the fixing shutter, and wherein in a case where the first link member is positioned at the separation position, the fixing shutter is positioned at the open position by being urged by an urging portion, and in a case where the first link member is positioned at the abutting position, the fixing shutter is positioned at the closed position by being pressed by the first link member against an urging force of the urging portion.

5. The image forming apparatus according to claim 4, wherein the link mechanism includes:

a link urging portion configured to urge the first link member toward the abutting position, and a second link member configured to move the first link member to the separation position against an urging force of the link urging portion in accordance with a closing operation of the opening/closing cover.

6. The image forming apparatus according to claim 1, wherein the opening/closing cover constitutes at least part of an exterior of the image forming apparatus.

7. The image forming apparatus according to claim 1, wherein the fixing unit includes:

a fixing film, a heater provided in the fixing film, and a pressurizing roller configured to form the fixing nip with the fixing film.

* * * * *